US006714915B1

(12) United States Patent
Barnard et al.

(10) Patent No.: US 6,714,915 B1
(45) Date of Patent: *Mar. 30, 2004

(54) SYSTEM AND METHOD FOR PROJECT DESIGNING AND DEVELOPING A PROCUREMENT AND ACCOUNTS PAYABLE SYSTEM

(75) Inventors: Ray F. Barnard, Endicott, NY (US); Lawrence J. Cartin, Endwell, NY (US); Louis M. Ciotoli, Jr., Endicott, NY (US); Philip J. Cirulli, Endicott, NY (US); Daniel M. Dauley, Windsor, NY (US); David J. DeSantis, Castle Creek, NY (US); Kerin J. Flannery, Endicott, NY (US); Carl J. Lanuti, Endwell, NY (US); Rose M. Oswald, Windsor, NY (US); Harry D. Stoke, Apalachin, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/444,255

(22) Filed: Nov. 22, 1999

(51) Int. Cl.[7] .............................................. G06F 17/60
(52) U.S. Cl. ........................................................ 705/7
(58) Field of Search .......................... 705/7–11; 707/10, 707/104.1, 500; 709/203

(56) References Cited

U.S. PATENT DOCUMENTS

| 4,862,376 | A |  | 8/1989 | Ferriter et al. ................. 700/7 |
| 4,875,162 | A |  | 10/1989 | Ferriter et al. ................ 705/29 |
| 5,189,606 | A |  | 2/1993 | Burns et al. ................... 705/10 |
| 5,224,034 | A |  | 6/1993 | Katz et al. ...................... 705/7 |
| 5,233,513 | A |  | 8/1993 | Doyle ............................. 705/7 |
| 5,283,745 | A |  | 2/1994 | Tanaka ......................... 700/99 |
| 5,287,267 | A |  | 2/1994 | Jayaraman et al. ........... 705/10 |
| 5,315,509 | A |  | 5/1994 | Natarajan .................... 705/28 |
| 5,381,332 | A |  | 1/1995 | Wood ............................. 705/8 |
| 5,450,317 | A |  | 9/1995 | Lu et al. ........................ 705/10 |
| 5,737,727 | A |  | 4/1998 | Lehmann et al. .............. 705/7 |
| 5,793,632 | A |  | 8/1998 | Fad et al. .................... 705/400 |
| 5,848,394 | A |  | 12/1998 | D'Arrigo et al. .............. 705/8 |
| 6,381,610 | B1 | * | 4/2002 | Gundewar et al. .......... 707/104 |

FOREIGN PATENT DOCUMENTS

EP  0 895 171 A2 *  2/1999  ........... G06F/17/60

OTHER PUBLICATIONS

Noori, Hamid and Russell Radford, *Production and Operations Management Total Quality and Responsiveness*, Chapter 12 "Project Management". New York; McGraw–Hill, Inc. 1995. 377–416.*
"SAP Offers End–User Training Products and Consulting Services, Furthering Its TeamSAP Commitment to Customers." Business Wire, Sep. 14, 1998.*
Stevens, Tim. "Proof Positive." Industry Week, vol. 247, No. 15, pp. 22–28, Aug. 17, 1998.*
"SAP Announces SAP FOCUS Initiative to Deliver First Solution For Complete Customer Relationship Life Cycle." Business Wire, Sep. 14, 1998.*
Anonymous, RD 417032, "On–line IP portfolio management and advice . . . ", Derwent Info Ltd., Dialog File 351:Derwent WPI data base printout, Abstract, Jan. 10, 1999.

* cited by examiner

Primary Examiner—Tariq R. Hafiz
Assistant Examiner—Susanna Meinecke-Díaz
(74) Attorney, Agent, or Firm—Shelley M Beckstrand

(57) ABSTRACT

A system for deploying to a client accounting installation a general procurement and accounts payable application specifically configured for the client by an enterprise includes a database server for (1) maintaining on a storage device a database of templates describing procedures for assessing, preparing, developing, deploying and supporting the application, and for (2) serving these templates to team members operating web-enabled terminals for coordinating, recording and tracking team activities with respect to the application while generating a description for adapting a front end server and an accounting system server to the requirements of the client.

32 Claims, 18 Drawing Sheets

US 6,714,915 B1

SYSTEM AND METHOD FOR PROJECT DESIGNING AND DEVELOPING A PROCUREMENT AND ACCOUNTS PAYABLE SYSTEM

CROSS REFERENCES TO RELATED APPLICATION

U.S. patent applications Ser. No. 09/444,257, entitled "System and Method for Assessing a Procurement and Accounts Payable System", Ser. No. 09/444,254, entitled "System and Method for Project Preparing a Procurement and Accounts Payable Process", Ser. No. 09/444,253, entitled "System and Method for Deploying a Procurement and Accounts Payable Process", and Ser. No. 09/444,256, entitled "System and Method for Ongoing Supporting a Procurement and Accounts Payable Process" filed concurrently herewith, are assigned to the same assignee hereof and contain subject matter related, in certain respect, to the subject matter of the present application. The above-identified patent applications are incorporated herein by reference.

BACKGROUND OF THE INVENTION

1. Technical Field of the Invention

This invention pertains to the implementation of a procurement and accounts payable system or application. More particularly, it relates to a system and method for assessing, preparing, designing and developing, deploying, and supporting a general procurement and accounts payable system using electronic requisitions.

2. Background Art

A services company may be very good at implementing information technology (IT) solutions. However, as customer engagements increase, the ability of company to execute numerous engagements on time and within budget with quality becomes more difficult.

Today there exist many different software packages that perform project management and classes that teach methodologies for implementing solutions that involve information technology and services. However, there is no process that combines these activities along with an evaluation of a client's general procurement (GP) and accounts payable (AP) system, or application, into one package while providing detailed implementation instructions along with templates for completing the major deliverables required over the course of the project. Templates, may be used herein as an equivalent term for page, form, or document as used in connection with Lotus Notes. In Lotus Notes, a page is a database design element that displays information; a form, like a page, displays information and also can be used to collect information; and documents are the elements that store information in the database. A user is presented a form including fields for entering information. When the user fills out the information and saves it, the information is saved in the data base as a document. When a user opens the document, the document uses the form as a template to provide the structure for displaying the data or information. Fields store data of various types, including text, dialog list, rich text, and so forth.

Scalability of engagements is a known problem, the most common solution to which is to increase the number of persons involved. Experience has shown that this increase results in customer dissatisfaction due to inadequate gathering of requirements, poorly trained implementation teams, missed schedules, increased costs, and lower quality.

It is characteristic of general procurement and accounts payable systems that no two are identical, and may differ even within wholly owned subsidiaries of a single corporation.

Consequently, there is a need in the art for a system and method for evaluating a potential client system and for adapting a general procurement and accounts payable system to the requirements of each of many potential clients. Further, there is a need for a system and method for evaluating a potential client system and for adapting a general procurement and accounts payable system to the requirements of each of many potential clients which can be licensed to third party providers together with a system and method for monitoring and assuring the quality of services provided by those service providers.

There is a need in the art for an integrated system for assessing, preparing, designing and developing, deploying, and supporting a procurement and accounts payable system using electronic requisitions.

During project assessment, typically potential customers are contacted and evaluated by a marketing team that then recommends a product solution from their menu. There is no integration of Technical Team Leaders and Transition Management as key components of the installation. There is also limited to no flexibility to customize the product for the customer.

There is a large body of work on project planning in industry. While they are all more or less adequate, they do not provide the comprehensive integration of the client and supplier teams, Transition Management, and Quality required to accomplish a particular customer's goals.

Like project planning, project design and development processes are well known in industry. They usually consist of a project manager or team leader that manages the implementation of a project plan and interfaces with the client.

Deployment or implementation of a project is, again, a very standard operation. As the project plan steps are completed, they are usually held in queue until all necessary activities reach a point where the solution can be "turned on".

All projects have close out functions that wrap up the end of the project. However, they do not provide for continuing support across the multitude of functions that have been used to provide the customer with a solution.

It is an objective of the invention to provide a system and method for evaluating a client's general procurement and accounts payable (GP/AP) system.

It is an object of the invention to provide an optimized solution for out-sourcing procurement of goods and services.

It is an object of the invention to provide a system and method for training service providers.

It is an object of the invention to provide a system and method for managing service providers to assure quality of service.

It is an object of the invention to provide a system and method for managing a project.

It is an object of the invention to provide an optimized general procurement and accounts payable system characterized by lower costs, a paperless process, and more comprehensive service with a shorter cycle time.

SUMMARY OF THE INVENTION

A system for developing a general procurement and accounts payable application includes a server; a storage device connected to the server; a plurality of team terminals; and a communication link interconnecting the server and terminals. The server is operable for (1) maintaining a database on the storage device of templates describing procedures for developing the application and (2) serving these templates to enterprise and customer team members operating the terminals for coordinating, recording and tracking team activities with respect to the application.

A method for developing a general procurement and accounts payable application includes the steps of maintaining a database of templates describing procedures for developing a general procurement and accounts payable system, and operating a plurality of web-enabled user terminals to access via a server database for coordinating tasks by a plurality of service provider and customer teams implementing the procedures.

In accordance with an aspect of the invention, there is provided a computer program product configured to be operable for developing a general procurement and accounts payable application.

Other features and advantages of this invention will become apparent from the following detailed description of the presently preferred embodiment of the invention, taken in conjunction with the accompanying drawings.

BRIEF DESCRIPTION OF THE DRAWINGS

FIGS. 5 and 6 also illustrate fields collected in the database and selectively displayed at user terminals of FIG. 1 for each summary and detail task, respectively, of a GP/AP system for a particular customer or project.

BEST MODE FOR CARRYING OUT THE INVENTION

Figure 1:
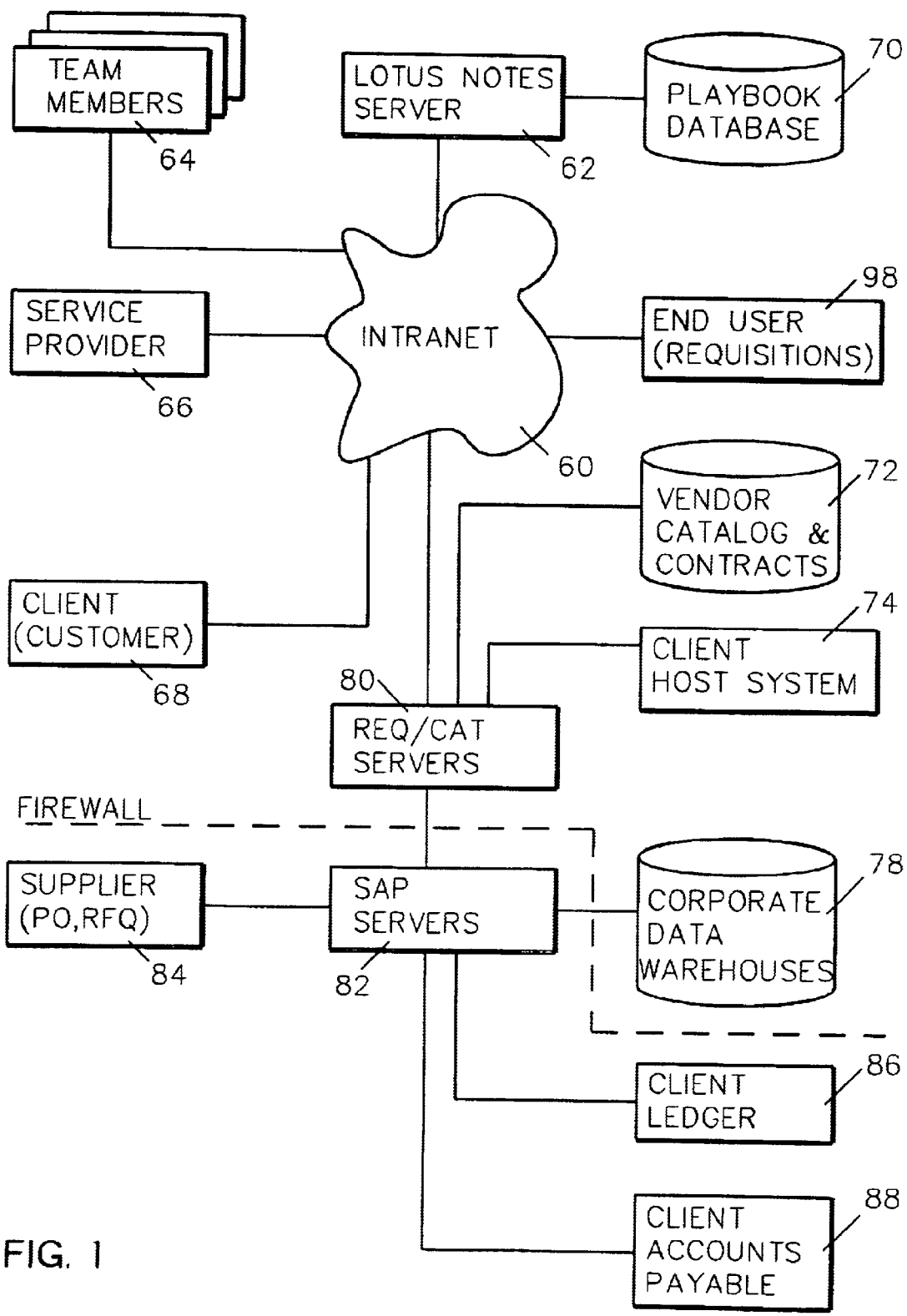
FIG. 1 is a high level block diagram of a general procurement and accounts payable development and implementation system in accordance with a preferred embodiment of the invention.

Referring to FIG. 1, in accordance with the preferred embodiment of the invention, intranet communication facilities interconnect a plurality of team member terminals 64, zero or more service provider terminals 66, and client (also referred to as customer) terminals 68, and a server 62, preferably a Lotus Notes server.

Server 62 references and maintains playbook database 70. Database (also referred to as the playbook, or playbook database) 70 is provided for implementing procurement and accounts payable systems. This playbook 70 defines implementation steps and templates for creating the many required deliverables and project management functions. These functions include start and end dates, effort, duration, and so forth. This playbook also provides the steps and templates for training service providers 66 and serves as the repository for completed templates and as a source for auditing the performance of the service providers. As used herein, unless otherwise apparent from the context, system and applications are used to refer to hardware, software, procedures, instructional materials, and so forth, for implementing a general procurement and accounts payable process.

Also attached to intranet 60 are requisition and catalog (Req/Cat) servers 80. Server 80 functions as a front end server to accounting system server 82, and is connected to a file of vendor catalogs and contracts 72, to a client (customer) host system 74, and through a firewall to SAP servers 82. SAP server 82 is an accounting driver for the procurement and accounts payable (A/P) system of the customer. SAP servers 82 are connected to supplier systems 84, to a customer data warehouse 78, and to customer ledger and accounts payable systems 86, 88.

During the operational phase of a completed and functioning system, a customer (aka end user, or client) 98 enters requisitions via the intranet to server 80. Server 80 accesses client host system 74 for pricing, reports, etc., and vendor catalogs and contracts 72 to gather information needed by SAP servers 82 to generate purchase orders or requests for quotes (RFQs) to supplier 84, to update data warehouse 78, client ledger 86, and client accounts payable 88 systems. Warehouse 78 stores client data maintained by the supplier of the Req/Cat and general procurement system, which supplier may be the primary enterprise (a primary services organization, such as the IBM Corporation) with control of the design and implementation of the system, or a contractor of the enterprise qualified as a third party service provider.

In operation, during presales, assessment, preparation, development, deployment and support stages, team members 64, access database 70 via intranet 60 and server 62 to create a playbook including a detailed description of an accounts payable and Req/Cat system for a particular customer (aka client). This description is then used to personalize Req/Cat servers 80 and SAP servers 82 for the customer installation. During operation, a user 98 accesses Req/Cat server 80 via intranet 60 to enter a requisition or to query the status of previously entered requisition. When entering a requisition, Req/Cat responds to end user 98 with a form to complete. Req/Cat 80 accesses SAP server 82 through the firewall with the requisition or request for status. SAP server 82, responsive to a requisition, issues a purchase order or request for quote to supplier 84, and updates accounts payable 88 and ledger 86, as required through the normal procurement and accounting process implemented on behalf of the customer.

Figure 2:
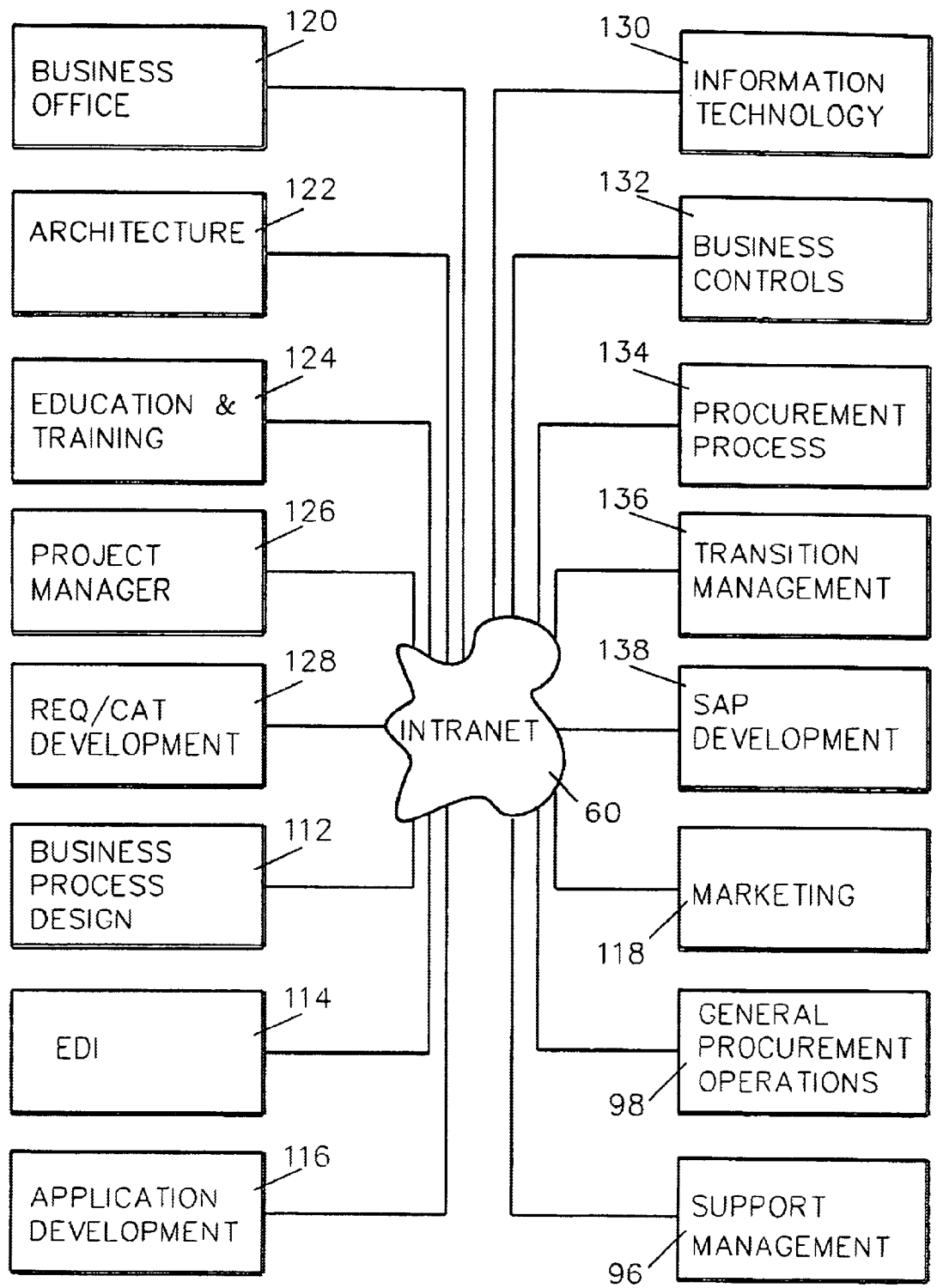
FIG. 2 is a block diagram illustrating team relationships within the general procurement and accounts payable (GP/AP) development and implementation system of a preferred embodiment of the invention.

Referring to FIG. 2, the various departments and individuals representing team members 64 include business office 120, architecture 122, education and training 124, project manager 126, Req/Cat development 128, business process design 112, electronic data interchange (EDI) 114, application development 116, information technology 130, business controls 132, procurement process 134, transition management 136, SAP development 138, marketing 118, general procurement operations 98, and support management 96. Each of these departments and individuals perform various rolls and functions during the life of the project from assessment through deployment and use, as will be more fully described hereafter in connection with FIG. 3.

Figure 3:
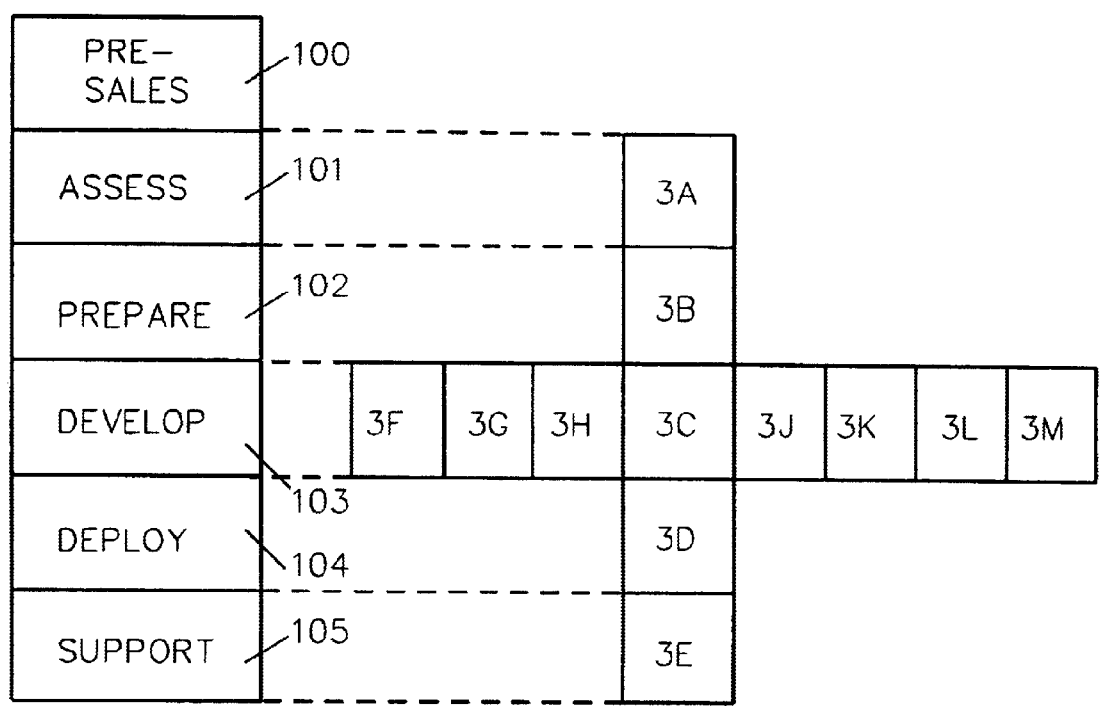
FIGS. 3A through 3H, 3J through 3M, arranged as shown in FIG. 3, are a flow diagram of the assessment, preparation, development, deployment and support phases of the method of a preferred embodiment of the invention.
Figure 3A:
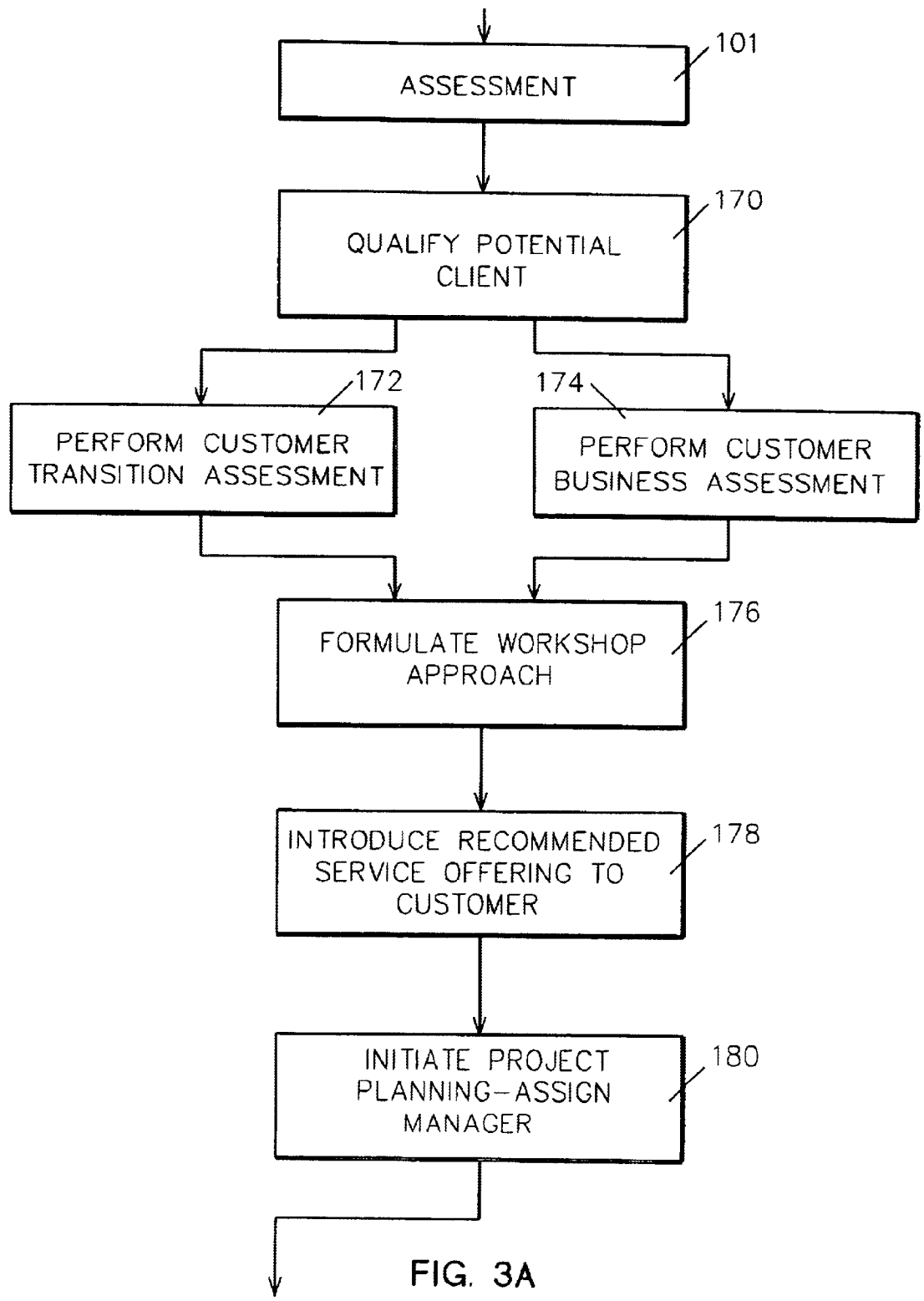
Figure 3B:
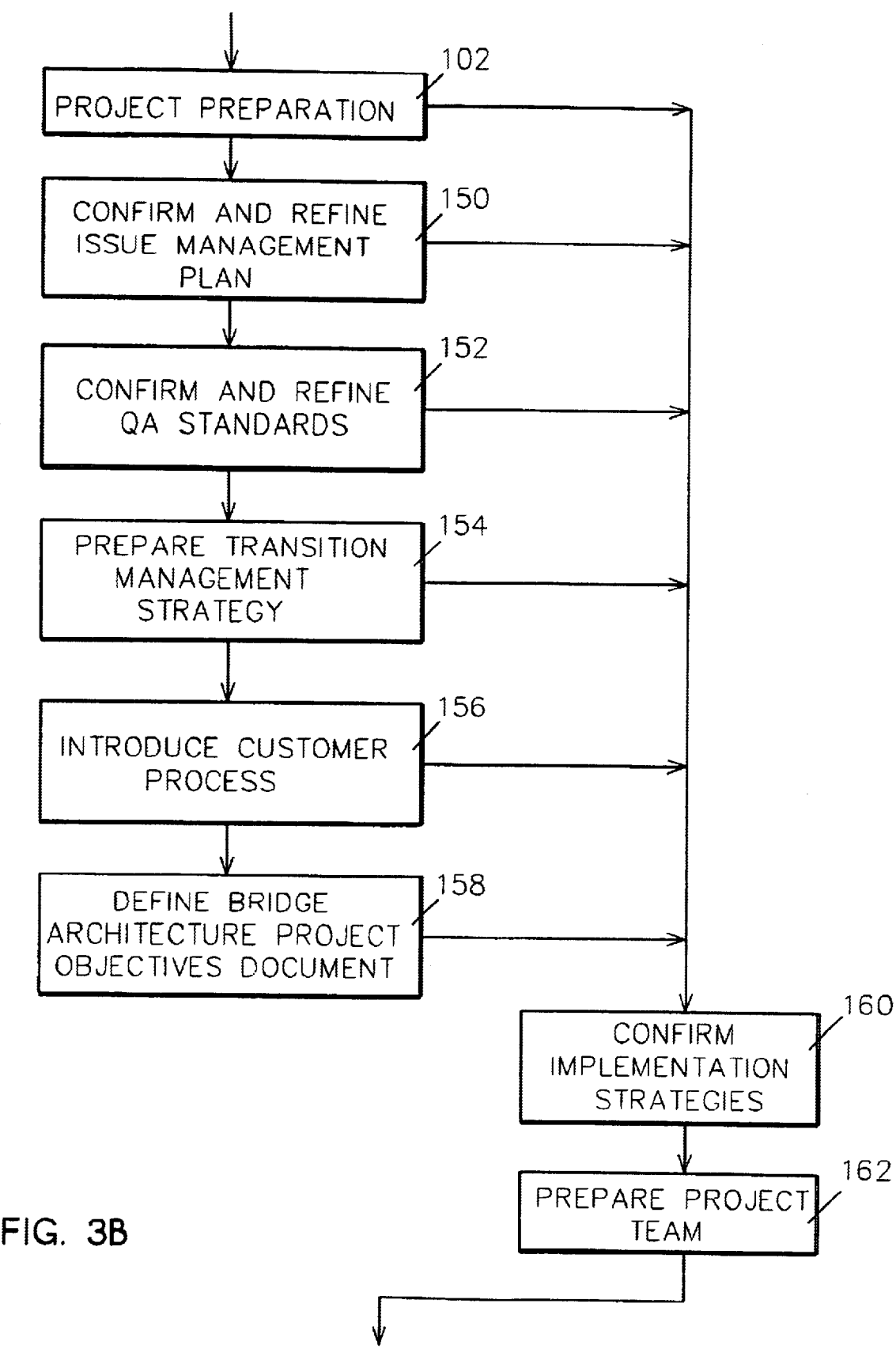
Figure 3C:
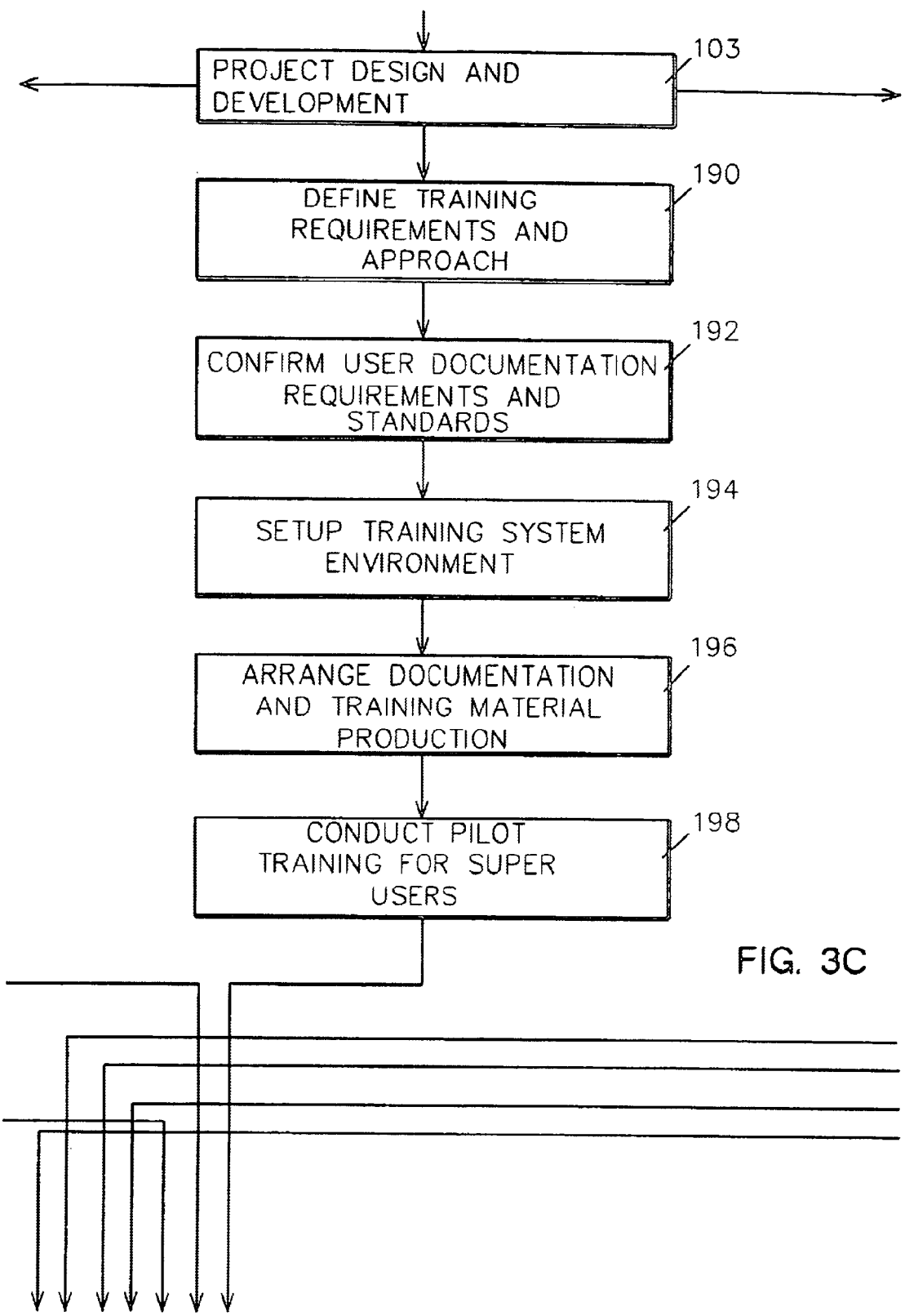
Figure 3D:
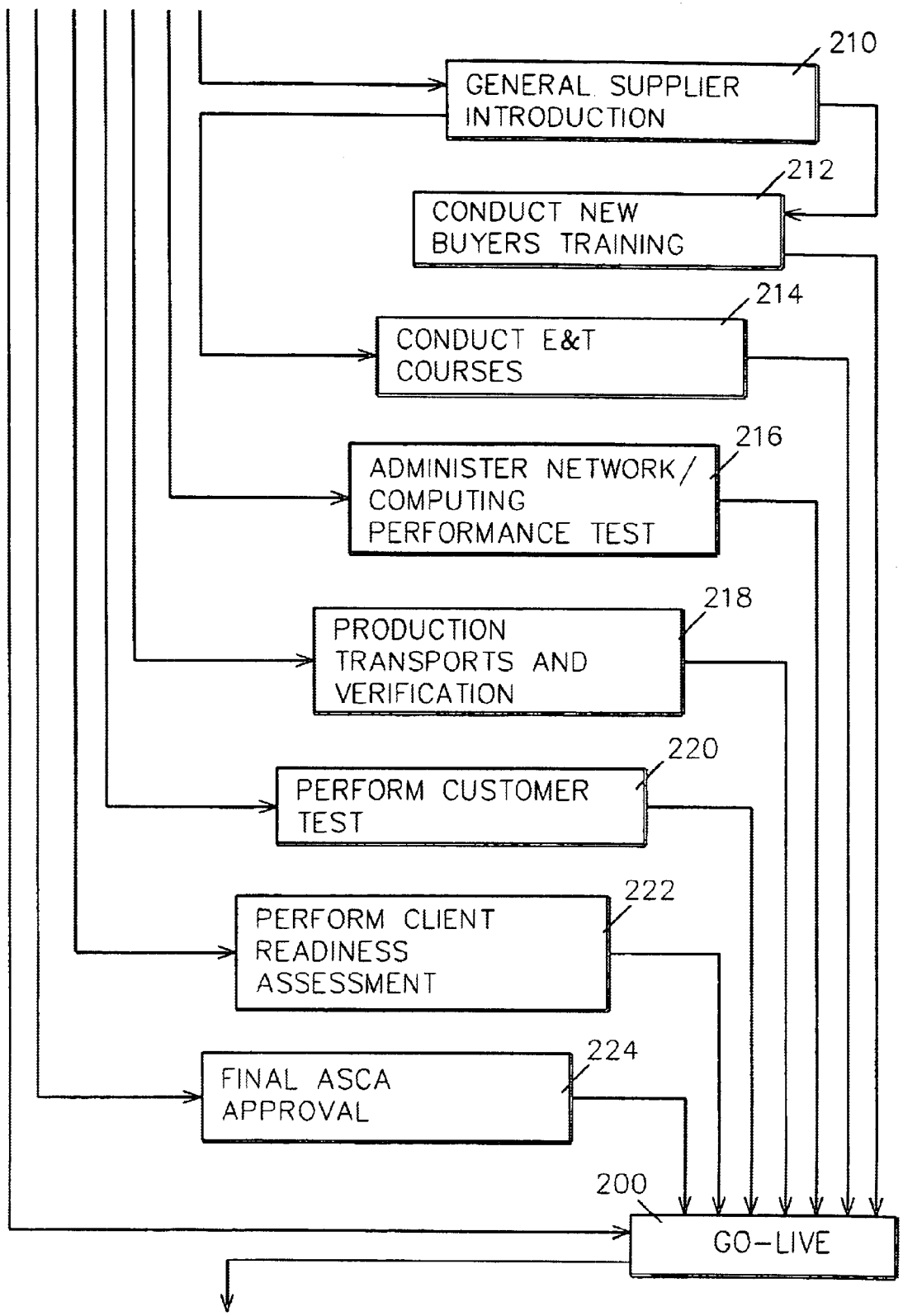
Figure 3E:
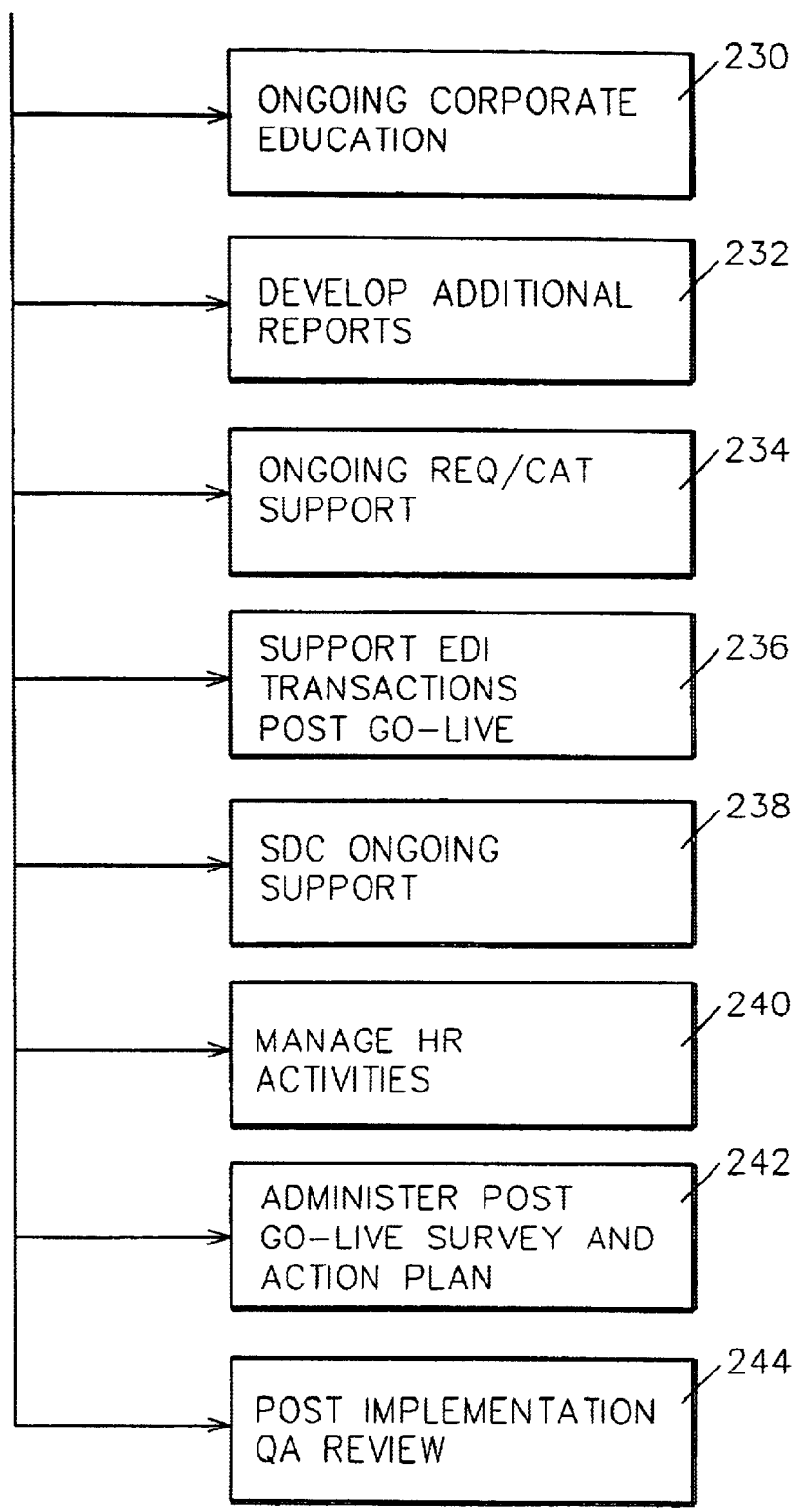
Figure 3F:
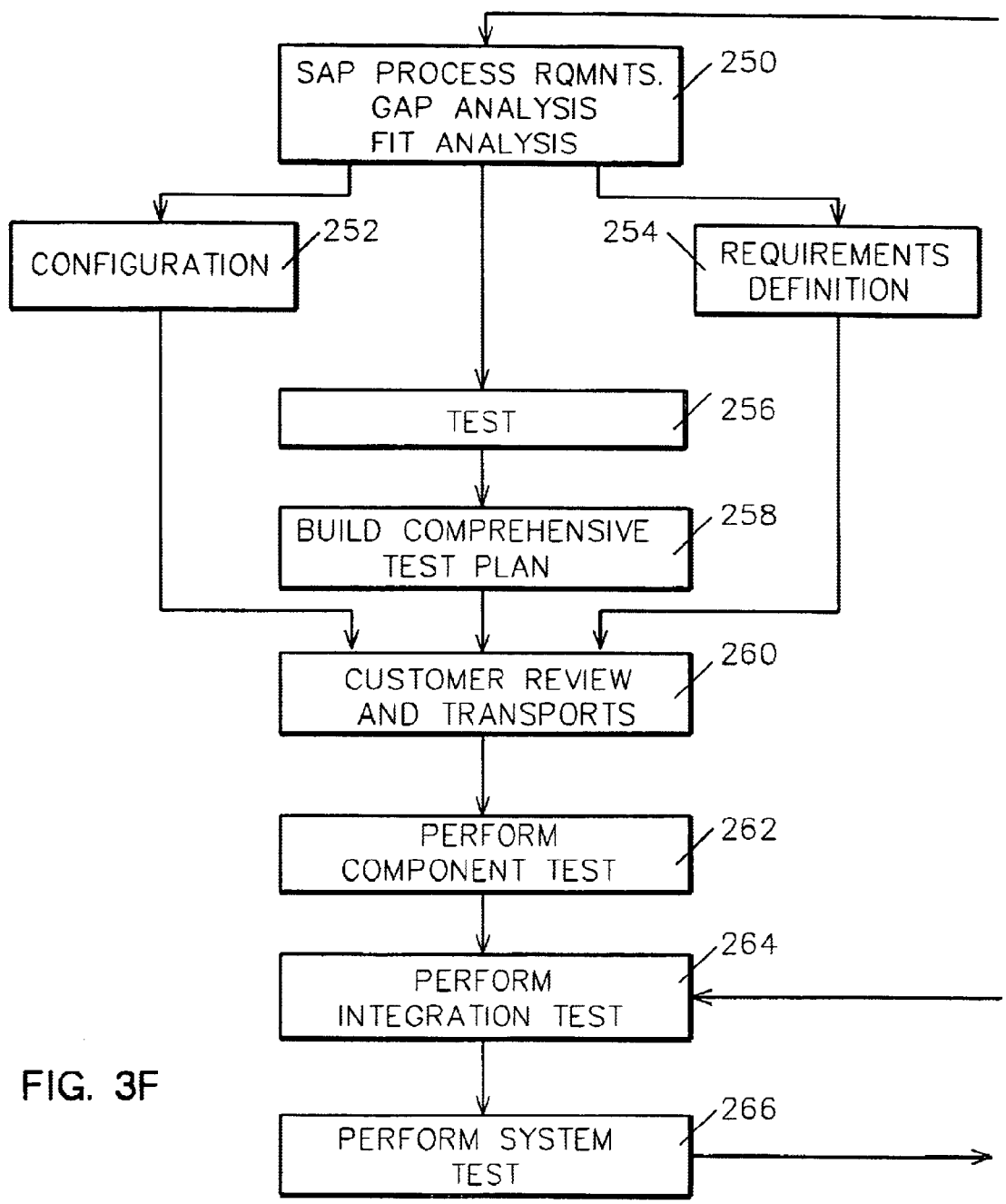

Referring to FIG. 3, in accordance with the preferred embodiment of the method of the invention, assessment 101, preparation 102, development 103, deployment 104 and support 105 stages are executed to design, implement, and use a general procurement and accounts payable (GP/AP) system for a customer. Through these stages 101–105, procedures and methods are provided for seamlessly integrating all aspects of a total GP/AP system, including creating an electronic purchase requisition for goods and services with flexible approval functions, through invoicing and payment.

Further in accordance with the preferred embodiment of the invention, there is provided a web enabled delivery system.

Further in accordance with the preferred embodiment of the invention, there is provided a system and method for auditing service provider activities without being on site.

High level summary tasks implemented by playbook 70 database include business controls, information technology, SAP, communication, process, testing, configuration, project management, transition management, education and training, requisition and catalog (Req/Cat). Each of these summary tasks, as well as the drill-down (aka subsidiary) tasks implementing the details of each, may be accessed by team members 64 and service provider 66s within the playbook database 70.

Figure 4:
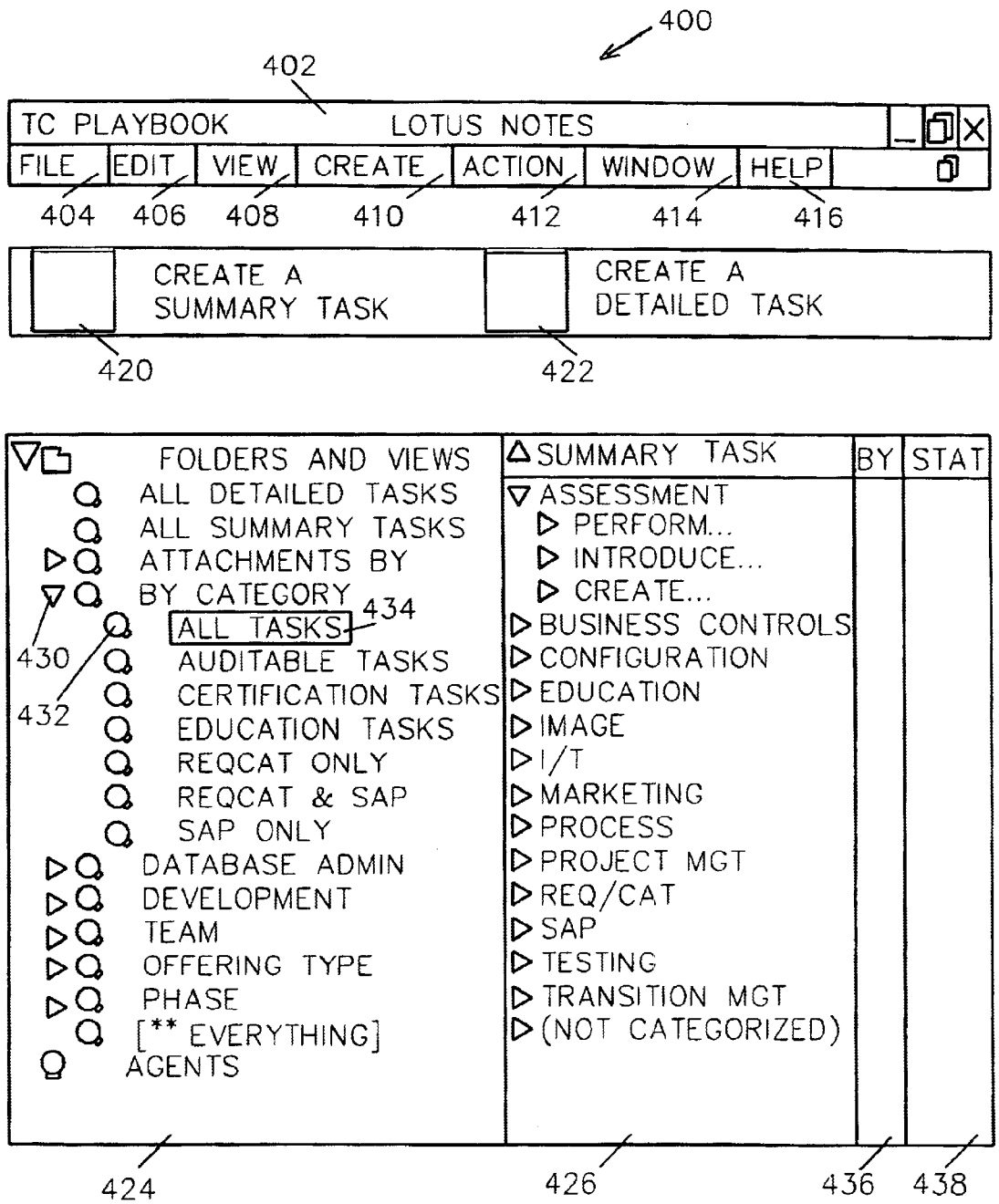
FIG. 4 represents a terminal display of a playbook summary view.

Referring to FIG. 4, the playbook summary view 400 is illustrated. View 400 includes a title bar 402; pull down menu tabs file 404, edit 406, view 408, create 410, actions 412, window 414, help 416; create a summary task selection button 420, create a detailed task button 422, a folders and views section 424, and a task title display and selection area 426 which also includes a by column 436 and a status column 438 with an entry for each task displayed in area 426. With by category button 430 and all tasks button 432 selected, all tasks 434 is highlighted and display 426 presents a listing of tasks organized by category.

Figure 5:
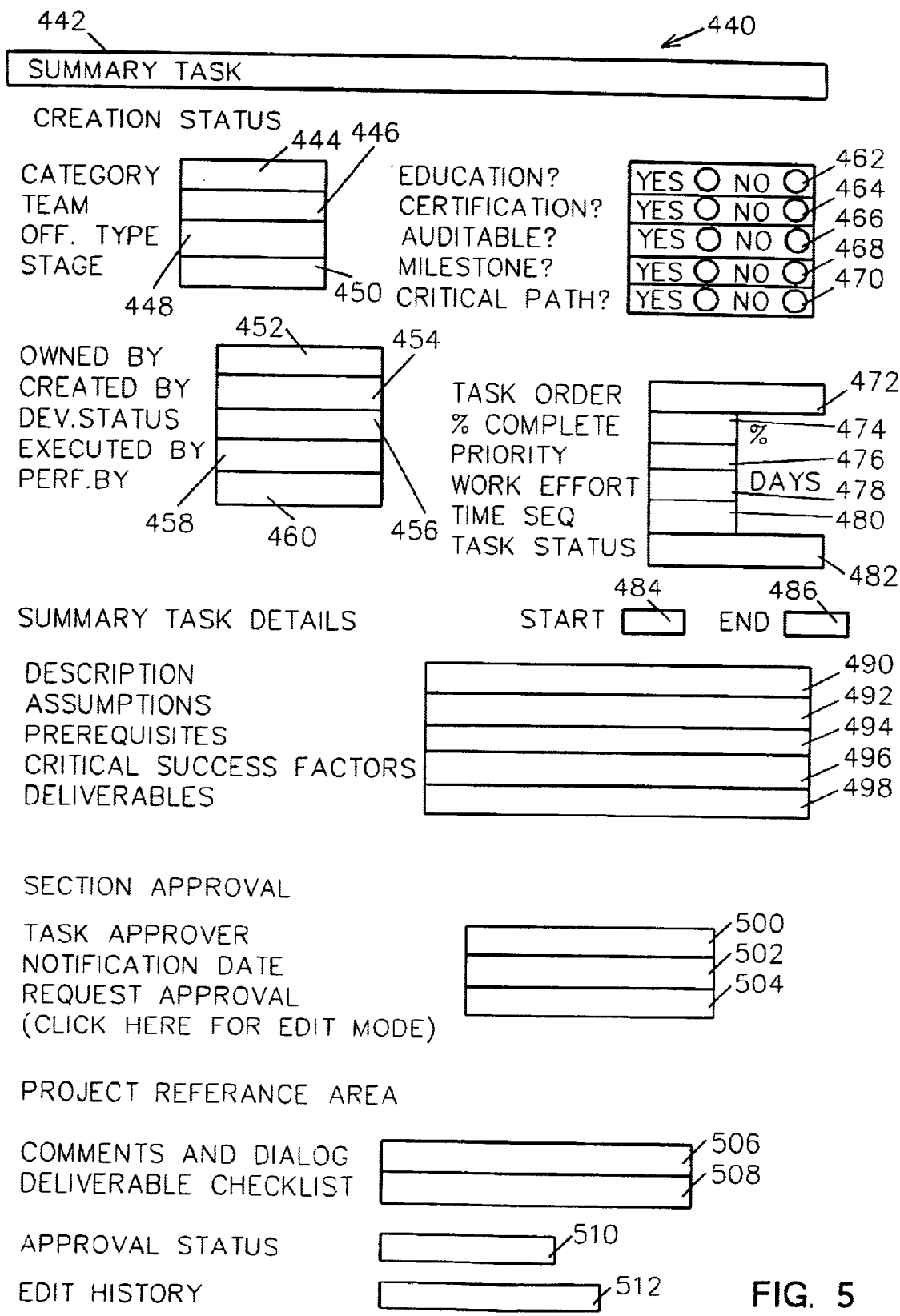
FIG. 5 illustrates a terminal display of the template presented by the server at a user terminal of FIG. 1 in response to selection by a user of "create a summary task" from the playbook summary view.
Figure 6:
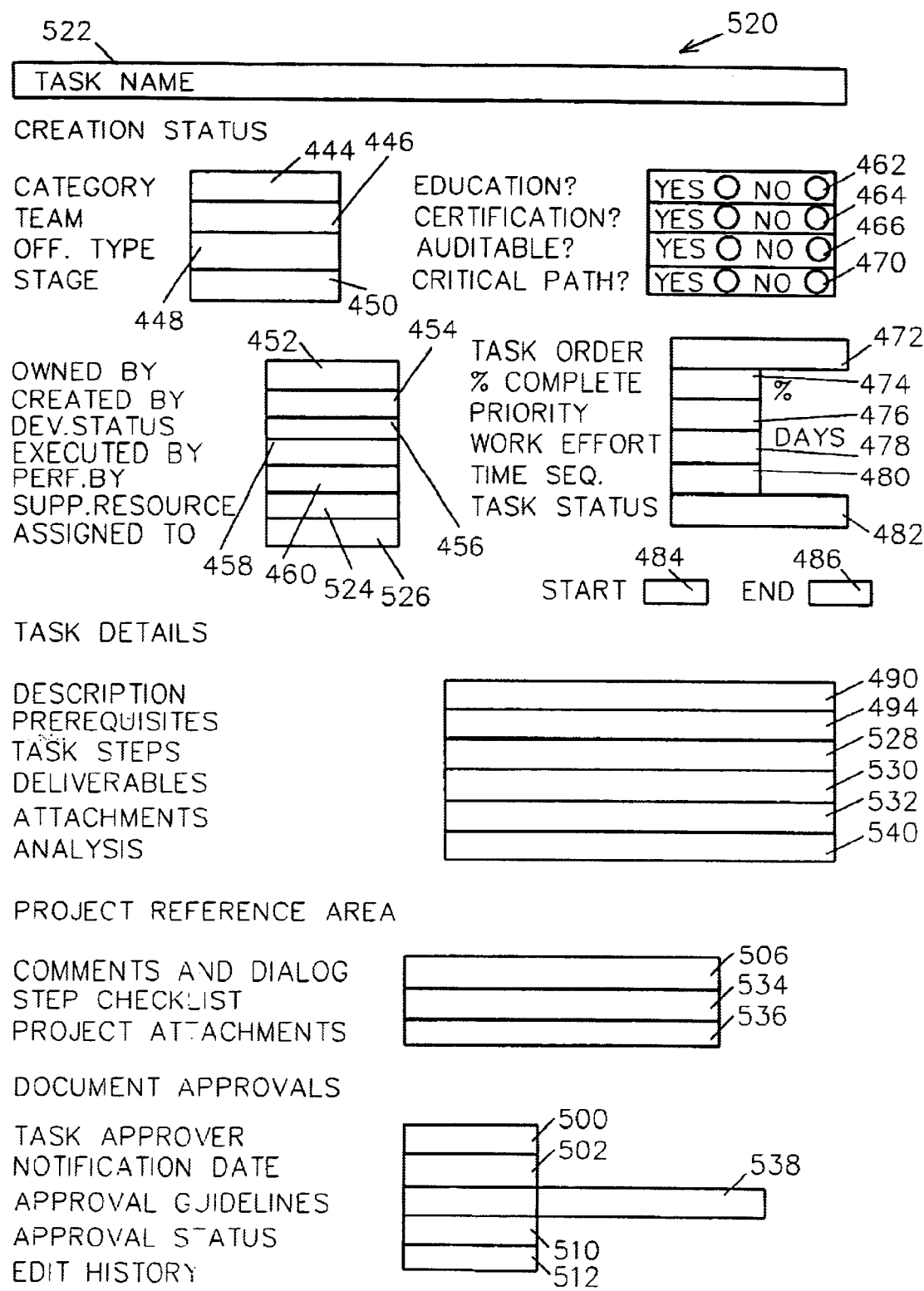
FIG. 6 illustrates a terminal display of the template presented by the server at a user terminal of FIG. 1 in response to selection by a user of "create a detailed task" from the playbook summary view.

Referring to FIG. 5, the summary task template 440 presented to the user upon selection of create a summary task 420 is illustrated. As will be described hereafter, there are two flavors of template 440, one for major operations, and one for major steps within each major operation. Referring to FIG. 6, the detail task template 520 presented to the user upon selection of create a detailed task 422 is illustrated.

Selection of create summary task 420 presents a first summary task template 440 that used to design and describe a high level summary task for one of the playbook operations. In a preferred embodiment of the invention, there are thirteen such high level summary tasks, including assessment, business controls, configuration, education, image, information technology (I/T), marketing, process, project management, requisition and catalog (req/cat), SAP, testing, and transition management. The summary and detail tasks within these high level summary tasks are further organized into five major processing segments: assessment 101, project preparation 102, project design and development 103, deployment 104, and ongoing support 105. A high level summary task provides a summary of the inputs to the task, and of the output (deliverables) after all detailed tasks are completed. There two levels, or templates for summary tasks: one for major operations, the second for major steps within each operation.

Activation of create a detail task 422 presents to the user a third template 520 which is used to summarize the detailed tasks for each major step of a summary task.

The first and second templates 440 are almost identical. They include the fields set forth in Tables 1 and 2. Third template 520 contents are summarized in Table 3.

TABLE 1

SUMMARY TASK TEMPLATES PART 1

| SECTION 1: | CREATION STATUS |
|---|---|
| Category 444: | Categories include education, req/cat development, SAP development, transformation management, architecture, procurement process. |
| Team 446: | Specific project team responsible for this task. |
| Offering type 448: | Kind of product being brought to client: req/cat only, SAP only, and req/cat and SAP. |
| Stage 450: | The stages are assessment 101, project preparation 102, project development 103, deployment 104, and support 105. |
| Doc owned by 452: | Team 140 owner of document, the designer of this one template. The teams 140 are those illustrated in FIG. 2. |
| Doc created by 454: | Author of this one template. |
| Dev status 456: | Approval status: first draft, final edit, final approval, etc. Only owner 452 can change this status. Only the owner 452 can approve the content of this template (task). |
| SECTION 2: | IMPORTANCE BUTTONS |
| Education 462: | Represents a combination of things, including (1) does someone need to be taught how to do this task, (2) is it something that should be included in the education package to the customer. |
| Certification 464: | Indicates whether or not an implementer of this task (ie, service provider) must be certified. |
| Auditable 466: | Indicates whether or not it is a task that Enterprise would be able to or needs to audit performance by the implementer/service provider |
| Milestone 468: | Indicates if this task is a critical accomplishment in the path of completing the implementation of the offering type. |
| Critical path 470: | Indicates if this is a task that must be completed in order to advance to the next task in order to complete the offering type, and can change during the course of the project as tasks are completed and the overall environment changes. |
| SECTION 3: | IMPLEMENTATION |
| Task order 472: | A number assigned to a detailed task that shows its order under the summary task. |
| % complete 474: | An estimate of how complete is this task document in its development for a particular customer. |
| Executed by 458: | Name of service provider (eg., Enterprise, or some Enterprise partner). |
| Performed by 460: | Technical team responsible for doing this task. |

TABLE 1-continued

SUMMARY TASK TEMPLATES PART 1

| | |
|---|---|
| Priority 476: | High, medium, low priority, based on whether this task is in critical path, and whether or not it needs to be done in support of some subsequent task. |
| Work effort 478: | Estimated time required to complete this task. |
| Sequence 480: | A number assigned to a summary task that shows its order under a higher level task. |
| Task status 482: | Represents how far the service provider has progressed in its implementation of this task. This is rolled up to Lotus Notes database 70 to enable the owner to track progress of the service providers during the audit phase. |

Table 2 sets forth the template 440 fields which may vary between templates, including those for major operations and major steps within an operation.

TABLE 2

SUMMARY TASK TEMPLATES PART 2

| SECTION 4: | SUMMARY TASK DETAILS |
|---|---|
| Description 490: | High level summary description of major operations or steps. |
| Assumptions 492: | What if any assumptions apply. |
| Prerequisites 494: | Tasks that must be completed before this task can complete. |
| Critical success factors 496: | Description of tools, techniques, relationships, understandings, technical and relationship skills and commitments, knowledge base of team and customer, and so forth, needed to accomplish this task. |
| Deliverables 498: | Expected output of this task. |
| SECTION 5: | APPROVALS |
| Task approver 500: | Identity of approvers. |
| Notification date 502: | Date approvers notified. |
| Request approval 504: | Electronic signature of approval. |
| SECTION 6: | PROJECT REFERENCE |
| Comments and dialog 506: | General comments (open season). |
| Deliverable checklist 408: | Checklist of deliverables. |
| Approval status 510: | List of approvers of this document and status of their approval. |
| Edit history 512: | Listing of persons who have modified this document during its preparation (service provider is not allowed to change these task descriptions.) |

TABLE 3

DETAIL TASK TEMPLATE

| SECTION 1: | CREATION STATUS |
|---|---|
| SECTION 2: | IMPORTANCE BUTTONS |
| SECTION 3: | IMPLEMENTATION |
| Sections 1, 2 and 3 are the same as for templates 440, with the addition of: | |
| Support resources 524: | People needed to support completion of this task. |
| Assigned to 526: | Person executing this task. |
| SECTION 4: | DETAIL TASK DETAILS |
| Description 490: | Description of this task. |
| Prerequisites 494: | Tasks that must be completed before this task can complete. |
| Task steps 528: | Specific detailed steps that need to be accomplished to complete the task. |
| Analysis 540: | A description of what needs to be analyzed to come up with the right answer for the customer. (The resulting output will vary depending upon the results of the analysis — but this document doesn't change as a result of the analysis). |
| Deliverables 530: | Expected output of the task. |
| Methodology attachments 532: | Potential attachments, may be blank: anything from presentation charts, to questionnaires, to architecture charts — depends upon the task. |
| SECTION 5: | PROJECT REFERENCE AREA |
| Comments & Dialog 506: | Comments. |
| Deliverable Checklist 508: | Checklist, attachment listing (other than method attachments, supra). |
| Approval status 510: | List of approvers and the status of their approval (with respect to approval of this document, not of the implementation of the task, which is handled by the audit process). |
| Edit history 512: | Listing of persons who have modified this document during its preparation (service provider is not allowed to change these task descriptions.) |

Database 70 at server 62 includes all summary and detail tasks templates which have been completed in a set for a particular customer. An initial set of the tasks listed in Table 4 is provided for each customer, but during project implementation phases 101–105, these are configured or personalized to the customer.

While many summary and detailed tasks of Table 4 do not appear in the flow chart of FIGS. 3A–3M, those selected illustrate a flow from start to finish across the five major stages—and form a representative, if not critical, path through them. As shown in FIGS. 3, and 3A–3M, the transitions between stages 100–105 are, in some instances, blurred and a particular task may be allocated to either or both of two of these stages.

In each stage, the key to success is the integration through the use of the templates of the groups (FIG. 2) and activities (Table 4, both summary tasks and detail tasks.) Also, an important aspect of the invention is the method provided across the five stages (FIG. 3) for effecting a transition from a legacy process, including hardware, software, work procedures and human resources, to a new process.

Table 4 is a chart of summary and detail tasks, pursuant to a particular embodiment of the invention, available for presentation in display area 426 of playbook summary view 400 upon selection of button 432. Selection by a user in display area 426 of a task designated with two or three alpha-numeric reference numerals P1, P11, P12, . . . , results in display of a template 440 personalized to the summary task, and selection of a task designated with four or more alpha-numeric reference numerals P111, P112, . . . , result in display of a template 520 personalized to the detail task. A user with appropriate authority may then view, correct, update, approve or otherwise modify the displayed task. The names of the detail tasks set forth broadly the functions or method steps performed in implementing the superior summary task. In Table 4, each summary task is identified in the first column by the stage 100–105 to which it pertains, in the second column by a task identifier P11, P12, . . . , and, for selected tasks, in the third column by the process step (150, . . . , 354 in FIGS. 3A–3M) to which it pertains. In general (with very few exceptions), a detail task pertains to the same stage 100–105 as its summary task.

TABLE 4

CHART OF SUMMARY AND DETAIL TASKS

| Stage | Task ID | Step | Summary Tasks / Detail Tasks |
|---|---|---|---|
| FOLDERS AND VIEWS BY CATEGORY | | | |
| | ALL TASKS | | |
| | P1 | | ASSESSMENT |
| 101 | P11 | | Perform customer service offering assessment |
| 101 | P111 | 174 | Perform customer business assessment |
| 101 | P112 | | Perform customer business assessment e-Req/Cat |
| 101 | P113 | | Develop workshop management plan |
| 101 | P114 | | Develop workshop management plan e-Req/Cat |
| 101 | P115 | | Review findings from marketing procurement consulting engagement |
| 101 | P116 | | Review findings from marketing procurement consulting engagement e-Req/Cat |
| 101 | P117 | 176 | Formulate workshop approach |
| 101 | P118 | | Formulate workshop approach e-Req/Cat |
| 101 | P119 | | Prepare for workshop |
| 101 | P11A | | Prepare for workshop e-req/Cat |
| 101 | P12 | 178 | Introduce recommend service offering to customer |
| 101 | P121 | | Present service offering to customer (perform workshop) |
| 101 | P122 | | Present service offering to customer (perform workshop) e-Req/Cat |
| 101 | P123 | | Formulate proposal approach |
| 101 | P124 | | Formulate proposal approach e-Req/Cat |
| 101 | P13 | | Create proposal and contract |
| 101 | P131 | | Develop and cost proposal |
| 101 | P132 | | Develop and cost proposal e-Req/Cat |
| 101 | P133 | | Draft and price customer contract |
| 101 | P134 | | Draft and price customer contract e-Req/Cat |
| | P2 | | BUSINESS CONTROLS |
| 103 | P21 | | Business control requirements |
| 103 | P211 | 290 | Confirm business controls requirements |
| 103 | P212 | | Confirm separation of duties (SOD) requirements |
| 104 | P213 | 292 | Conduct ASCA self-assessment |
| 104 | P214 | | Risk assessment |
| 104 | P215 | 224,294 | Conduct ASCA/business controls review |
| 102 | P2151 | | Confirm image production system management strategy |
| | P3 | | CONFIGURATION |
| 103 | P31 | 320 | Conduct Req/Cat functional detailed fit gap analysis |
| 103 | P311 | | Confirm Req/Cat organizational hierarchy |
| 103 | P312 | | Define the Req/Cat functional detailed fit |

TABLE 4-continued

CHART OF SUMMARY AND DETAIL TASKS

| Stage | Task ID | Step | Summary Tasks / Detail Tasks |
|---|---|---|---|
| 103 | P313 | | Resolve functional gaps for Req/Cat |
| 103 | P32 | 324 | Configure Req/Cat offering |
| 103 | P321 | | Confirm and refine "Ives Team Studio" for code tracking |
| 103 | P322 | | Confirm and refine Req/Cat initial settings and organizational structure |
| 103 | P323 | | Confirm and refine Req/Cat authorizations |
| 103 | P324 | | Refine and validate final Req/Cat configuration |
| 103 | P33 | | Customize Req/Cat offering |
| 103 | P331 | | Validate and customize Req/Cat core application change request |
| 103 | P332 | | Refine and validate final customization for Req/Cat |
| 103 | P34 | | Produce custom Req/Cat programs |
| 103 | P341 | 276 | Validate and code bridge change requests (SAP and Req/Cat) |
| | P4 | | EDUCATION AND TRAINING |
| 102 | P41 | | Develop customer education and training strategy |
| 102 | P411 | | Validate customer education & training objectives |
| 102 | P412 | 190 | Define the training requirements and approach |
| 102 | P413 | | Confirm the education & training strategy |
| 102 | P42 | | Define system management processes |
| 102 | P421 | | Define SAP correction and transport process |
| 102 | P422 | | Define and agree on service level agreement SLA |
| 102 | P423 | | Define and administer SAP release control process |
| 102 | P424 | | Define Req/Cat transport process |
| 102 | P425 | | Define and administer version control process |
| 103 | P43 | 192 | Define user documentation and training requirements |
| 103 | P431 | | Define customer user audiences and requirements |
| 103 | P432 | | Confirm user documentation requirements and standards |
| 103 | P433 | | Conduct detailed end-user task analysis |
| 103 | P434 | | Assess user skills and training needs |
| 103 | P435 | | Validate end-user courses and content |
| 103 | P436 | | Identify users and course attendees |
| 103 | P437 | | Define and notify training attendees |
| 103 | P44 | | Develop user training documentation |
| 103 | P441 | | Produce customer specific end-user documentation |
| 103 | P442 | | Confirm training evaluation materials/approach with customer |
| 103 | P443 | 194 | Setup training system environment |
| 103 | P444 | | Validate training logistics |
| 103 | P445 | 198 | Conduct pilot training with super users |
| 103 | P446 | 196 | Arrange documentation and training material production |
| 103 | P45 | | Internal (Enterprise, service provider) training requirements |
| 103 | P451 | | Identify and organize appropriate internal training |
| 104 | P46 | | Conduct end-user training |
| 104 | P461 | | Conduct train-the-trainer sessions |
| 104 | P462 | 214,230 | Perform training |
| 104 | P463 | 212 | Conduct new buyer training |
| | P5 | IMAGE | |

TABLE 4-continued

CHART OF SUMMARY AND DETAIL TASKS

| Stage | Task ID | Step | Summary Tasks<br>Detail Tasks |
|---|---|---|---|
| 103 | P51 | | Conduct image functional detailed fit gap analysis |
| 103 | P511 | | Define the image functional detailed fit |
| 103 | P512 | | Resolve image functional gaps |
| 103 | P52 | | Configure image offering |
| 103 | P521 | | Refine and validate final image configuration |
| 103 | P522 | | Confirm and refine image initial settings |
| | P6 | I/T | |
| 103 | P61 | | Establish customer network/computing infrastructure |
| 103 | P611 | | Confirm component delivery |
| 103 | P612 | | Establish network/computing hardware/software architecture infrastructure |
| 103 | P613 | | Ready network/computing environment |
| 103 | P62 | | Establish EDI infrastructure |
| 103 | P621 | | Establish EDI infrastructure |
| 103 | P622 | | Conduct trading partner testing (IT) |
| 102 | P623 | | Confirm EDI strategy |
| 102 | P6231 | | Setup image system environments |
| 103 | P6232 | | Establish cutover checklist and perform pre-cutover activities for image production environment |
| 104 | P6233 | | Validate image production support for system management |
| 103 | P63 | | Develop reporting infrastructure |
| 103 | P631 | | Develop reporting infrastructure (LIS/EIS) |
| 103 | P632 | | Develop DataMart extracts |
| 103 | P633 | 232 | Develop additional reports (customer/operations) |
| 102 | P64 | | Perform bridge architecture assessment |
| 102 | P641 | | Perform bridge architecture integration point interfaces work session |
| 102 | P642 | 158 | Define bridge architecture project objectives document |
| 102 | P65 | | Validate bridge, EDI, vendor reporting requirements |
| 102 | P651 | 270 | Develop and manage bridge architecture implementation work plan |
| 102 | P652 | | Analyze EDI requirements |
| 102 | P653 | | Determine EDI communication environment |
| 102 | P654 | | Analyze vendor master data load |
| 102 | P655 | | Analyze operational reporting requirements |
| 102 | P656 | | Analyze customer requirements for DataMart implementation |
| 102 | P657 | | Schedule and conduct weekly interlock meeting |
| 102 | P658 | | Vendor lead client analysis |
| 102 | P66 | | Set up development/integration environment |
| 102 | P661 | | Set up SAP development/integration environment |
| 102 | P662 | | Set up Req/Cat system environments |
| 103 | P67 | | Set up consolidation/test environment |
| 103 | P671 | | Set up SAP consolidation/test environment |
| 104 | P68 | 218 | Set up production environment |
| 104 | P681 | | Convert vendor master into production environment |
| 104 | P682 | | Determine EDI tasks for production environment set up |
| 104 | P683 | | Execute SAP cutover checklist |
| 104 | P684 | | Set up SAP production environment |

TABLE 4-continued

CHART OF SUMMARY AND DETAIL TASKS

| Stage | Task ID | Step | Summary Tasks / Detail Tasks |
|---|---|---|---|
| 104 | P685 | | Establish SAP batch schedule |
| 104 | P686 | | Set up trading partners in production environment |
| 104 | P687 | | Vendor lead client deployment |
| 103 | P688 | | Establish cutover checklist and perform pre-cutover activities for SAP production environment |
| 103 | P689 | | Establish cutover checklist and perform pre-cutover activities for e-Req/Cat production environment |
| 105 | P69 | | Refine/execute production support for system management |
| 105 | P691 | 234 | Perform on-going support activities for Req/Cat |
| 105 | P692 | | Post deployment reporting support |
| 105 | P693 | | Develop new bridges and application extensions post go live |
| 105 | P694 | 236 | Support new EDI transactions post go live |
| 105 | P695 | | Execute system management security support procedures |
| 105 | P696 | | Execute data management support procedures |
| 105 | P697 | 236 | Execute EDI support procedures |
| 105 | P698 | | Execute system management operational support desk procedures |
| 105 | P699 | | Execute system management batch support desk procedures |
| 105 | P69A | | Execute system management SAPBI support procedures |
| 105 | P69B | | Execute system management master data support procedures |
| 105 | P69C | | Execute production support for system management |
| 103 | P6A | | Establish vendor master environment |
| 103 | P6A1 | | Establish vendor master |
| 103 | P6A2 | | Confirm vendor master |
| 103 | P6A3 | | ALE configuration for VLC |
| 103 | P6B | | Establish bridge architecture infrastructure environment |
| 103 | P6B1 | 272 | Develop detail architecture requirements definition |
| 102 | P6C | 274 | Validate system infrastructure requirements |
| 102 | P6C1 | 280 | Analyze current network/computing infrastructure |
| 102 | P6C2 | | Determine network/computing requirements for project |
| 102 | P6C3 | | Confirm and begin network/computing component acquisition |
| 102 | P6C4 | | Order and delivery of infrastructure components |
| | P7 | MARKETING | |
| 100 | P71 | | Participate in marketing procurement consulting engagement |
| 100 | P711 | 170 | Qualify potential client |
| 100 | P712 | | Qualify potential client e-Req/Cat |
| 100 | P713 | | Develop assessment statement of work (SOW) e-Req/Cat |
| 100 | P714 | | Develop assessment statement of work (SOW) |
| | P8 | PROCESS | |
| 102 | P81 | 156 | Customer process introduction |
| 102 | P811 | | Conduct customer introduction to Golden procurement and A/P processes |
| 102 | P82 | | Process reviews with customer - procurement and A/P |
| 102 | P821 | 344 | Review procurement processes with customer |

TABLE 4-continued

CHART OF SUMMARY AND DETAIL TASKS

| Stage | Task ID | Step | Summary Tasks<br>Detail Tasks |
|---|---|---|---|
| 102 | P822 | 342 | Review A/P processes with customer |
| 102 | P83 | | Assess customer impact on internal Enterprise workload |
| 102 | P831 | | Identify current and potential supplier catalogs for customer |
| 102 | P832 | 340 | Perform assessment of customer purchasing business |
| 103 | P84 | | Process alignment customer/Golden |
| 103 | P841 | | Determine GAPs between customer and golden processes |
| 103 | P842 | | Perform process GAP resolution |
| 103 | P85 | | BMP process and procedures management |
| 103 | P851 | | Codes and procedures |
| 103 | P852 | 348 | Update and review process management & procedures manual |
| 103 | P86 | | Supplier readiness |
| 103 | P861 | 210 | General supplier introduction |
| 103 | P862 | | Manage trading partner - EDI suppliers |
| 103 | P863 | 346 | Establish ASAP suppliers for customer (ASAP = a SAP supplier not requiring a buyer) |
| 103 | P864 | | Manage customer supplier outline agreements |
| 103 | P865 | | Customer freight procedures |
| 104 | P866 | | Supplier memo mailing |
| | P9 | | PROJECT MANAGEMENT |
| 102 | P91 | 180 | Initiate project planning |
| 102 | P911 | 160 | Confirm project scope and implementation strategy |
| 102 | P912 | | Confirm project organization and assign resources to roles |
| 102 | P913 | | Prepare and validate project plan and procedures |
| 102 | P914 | | Establish project team working environment |
| 102 | P915 | | Orient project team |
| 102 | P92 | 150 | Confirm and refine project management standards and procedures |
| 102 | P921 | | Confirm and refine issue management plan |
| 102 | P922 | | Confirm and refine project documentation |
| 102 | P923 | 152 | Confirm and refine quality assurance standards |
| 102 | P924 | | Create team building plan |
| 102 | P93 | | Confirm implementation strategies |
| 102 | P931 | | Confirm system configuration standards |
| 103 | P9311 | | Customize image offering |
| 103 | P9312 | | Validate and customize image core application change request |
| 103 | P93121 | | Refine and validate final customization for image |
| 102 | P932 | | Confirm CR/PTR process |
| 102 | P933 | | Confirm testing strategy |
| 102 | P934 | | Confirm production support & operations strategy |
| 102 | P935 | | Confirm SAP production system management strategy |
| 102 | P936 | | Confirm e-Req/Cat production system management stategy |
| 102 | P937 | 282 | Confirm network/computing strategy |
| 102 | P938 | | Confirm vendor conversion strategy |
| 102 | P94 | 162 | Prepare project team |
| 102 | P941 | | Conduct kick-off meeting |
| 102 | P942 | | Conduct project team standards meeting |
| 102 | P943 | | Conduct project team training |
| 102 | P95 | 352 | Define production support plans |
| 102 | P951 | | Define system management SAP resource requirements |
| 102 | P952 | | Define system management e-Req/Cat resource requirements |

TABLE 4-continued

CHART OF SUMMARY AND DETAIL TASKS

| Stage | Task ID | Step | Summary Tasks / Detail Tasks |
|---|---|---|---|
| 102 | P953 | | Define production support accounts payable plan |
| 102 | P954 | | Define production support CSC plan |
| 102 | P955 | | Define production support general procurement plan |
| 102 | P956 | | Confirm SAP system authorizations for project team |
| 102 | P957 | | Confirm Req/Cat access control list (ACL) |
| 102 | P958 | | Define system management image resource requirements |
| 102 | P96 | | Initial quality assurance review |
| 102 | P961 | | Initial QA review |
| 103&104 | P97 | | Review project status and refine project plan |
| 103,&104 | P971 | | Conduct project team status meetings |
| 103&104 | P972 | | Conduct steering committee meetings |
| 101 | P98 | | Obtain customer approval |
| 102 | P981 | | Won bid analysis/transition to implementation team |
| 102 | P982 | | Won bid analysis/transition to implementation team e-Req/Cat |
| 101 | P983 | | Conduct lost bid analysis |
| 101 | P984 | | Conduct lost bid analysis e-Req/Cat |
| 104 | P99 | | Validate production support |
| 104 | P991 | | Validate SAP production support for system management |
| 104 | P992 | | Validate production support for accounts payable |
| 104 | P993 | | Validate production support for CSC |
| 104 | P994 | | Validate production support for general procurement |
| 104 | P995 | | Validate Req/Cat production support for system managment |
| 105 | P996 | | Validate education & training production support activities |
| 104 | P9A | | Perform go live project office activities |
| 104 | P9A1 | | Ensure go live check lists activities |
| 104 | P9A2 | | Go/no-go decision for go live |
| 103&104 | P9B | | Interim quality assurance reviews |
| 103&104 | P9B1 | | Interim QA reviews |
| 105 | P9C | 244 | Post-implementation quality assurance review |
| 105 | P9C1 | | Post-implementation QA review |
| 105 | P9D | | Production support review |
| 105 | P9D1 | | Confirm production environment |
| | PA | REQ/CAT | |
| 102 | PA1 | | Identify customer responsibilities for Req/Cat |
| 102 | PA11 | | Identify country/global administrators & neg. con person |
| 102 | PA12 | | Perform country administrator education |
| 103 | PA2 | | Prepare and load Req/Cat catalog data |
| 103 | PA21 | | Perform Req/Cat catalogue tasks |
| 104 | PA3 | | Req/Cat production readiness |
| 104 | PA31 | | Confirm Req/Cat for production environment |
| 104 | PA32 | | Set up Req/Cat tables in production |
| 104 | PA33 | | Prepare Req/Cat production copy |
| 104 | PA34 | | Execute Req/Cat go live checklist |
| | PB | SAP | |
| 103 | PB1 | 254 | Conduct SAP functional detailed fit gap analysis |
| 103 | PB11 | 250 | Confirm SAP organizational hierarchy |
| 103 | PB12 | | Define the SAP functional detailed fit |

TABLE 4-continued

CHART OF SUMMARY AND DETAIL TASKS

| Stage | Task ID | Step | Summary Tasks / Detail Tasks |
|---|---|---|---|
| 103 | PB13 | | Resolve SAP functional gaps |
| 103 | PB2 | | Produce custom SAP programs |
| 103 | PB21 | | Develop and validate SAP custom programs |
| 103 | PB3 | 252 | Configure SAP offering |
| 103 | PB31 | | Confirm and refine implementation guide |
| 103 | PB32 | | Confirm and refine SAP initial settings and organizational structure |
| 103 | PB33 | | Confirm and refine SAP end user authorization profiles |
| 103 | PB34 | | Refine and validate final SAP configuration |
| 103 | PB4 | | Customize SAP offering |
| 103 | PB41 | | Validate and customize SAP core application change request |
| 103 | PB42 | | Refine and validate final customization for SAP |
| | PC | | TESTING |
| 103 | PC1 | 256,260,322 | Perform preparation activities for testing (both Req/Cat and SAP) |
| 103 | PC11 | | Confirm and refine test case templates |
| 103 | PC12 | 258,326 | Build comprehensive test plan |
| 103 | PC13 | | Develop test environment plan |
| 103 | PC14 | | Create test case specifications |
| 103 | PC15 | | Build/reuse test cases |
| 103 | PC16 | | Determine testing tools |
| 103 | PC17 | | Review and validate comprehensive test plan |
| 103 | PC2 | 216 | Perform comprehensive testing |
| 103 | PC21 | | Perform unit test |
| 103 | PC22 | 262 | Perform component test |
| 103 | PC23 | 264,328 | Perform integration test |
| 103 | PC24 | | Administer network/computing performance monitoring |
| 103 | PC25 | 266,330 | Perform system test |
| 103 | PC26 | 220 | Perform user acceptance test |
| 103 | PC27 | | Perform other required testing |
| 103 | PC271 | | Support comprehensive image testing |
| 103 | PC28 | | Support comprehensive e-Req/Cat testing |
| 103 | PC29 | | Support comprehensive SAP testing |
| 103 | PC2A | | Support comprehensive image testing |
| | PD | | TRANSITION MANAGEMENT |
| 101 | PD1 | 172 | Introduce transition management (assessment) |
| 101 | PD11 | 172 | Develop initial assessment of client |
| 101 | PD12 | | Provide transition management workshop presentation |
| 102 | PD2 | 154 | Model transition management (project preparation) |
| 102 | PD21 | | Provide transition management strategy |
| 102 | PD22 | | Evaluate cultural impact of solution |
| 102 | PD23 | 300 | Develop/confirm transition management plan |
| 102 | PD3 | | Develop communication plan (project preparation) |
| 102 | PD31 | 304 | Build/confirm campaign plan |
| 102 | PD32 | 302 | Update communications trategy |
| 102 | PD33 | | Deliver announcement/kickoff communication |
| 103 | PD4 | | Initialize transition management (design and development) |
| 103 | PD41 | | Create incentive/reward program |
| 103 | PD42 | | Assess supplier impacts related to transition management |

TABLE 4-continued

CHART OF SUMMARY AND DETAIL TASKS

| Stage | Task ID | Step | Summary Tasks / Detail Tasks |
|---|---|---|---|
| 103 | PD43 | | Assess Enterprise support impacts related to transition management |
| 103 | PD44 | | Design detail go live material/activities |
| 103 | PD45 | 308 | Create policy changes |
| 103 | PD46 | | Identify/plan for security |
| 103 | PD47 | | Detail process transition plan |
| 103 | PD48 | 306 | Detail human resources plan |
| 103 | PD49 | | Detail employee relations plan |
| 104 | PD5 | | Ensure transition management activities (deploy) |
| 104 | PD51 | 350 | Ensure new process management system in place |
| 104 | PD52 | 222 | Perform client readiness assessment |
| 104 | PD53 | | Perform transition management go live activities |
| 104 | PD54 | 240 | Manage human resources activities |
| 105 | PD6 | | Communication (support) |
| 105 | PD61 | | Thanks to users/suppliers |
| 105 | PD7 | | Validate transition management (support) |
| 105 | PD71 | | Monitor human resource issues |
| 105 | PD72 | | Assess effectiveness of transition management program |
| 105 | PD8 | | Perform post implementation survey (support) |
| 105 | PD81 | 242 | Administer post go live survey |
| 105 | PD82 | | Present and act upon survey findings |
| | PE | | NOT CATEGORIZED |
| 104 | PE1 | 200 | Perform go live process activities |
| 104 | PE11 | | Allocate buyer codes to commodities |
| 104 | PE12 | | Enter blanket orders |
| ... | PE2 | | Table template document |
| ... | PE21 | | Table template document |

Project Assessment 101

Referring to FIG. 3 in connection with FIG. 2, project assessment phase 101 follows pre-sales phase 100, during which marketing makes its initial contact with the prospective client, or customer.

After initial contact from marketing 118, the main thrust of Assessment Project 101 is to provide an integrated, cross-functional customer solution to the client. An assessment team is led by the Business Office 120, but requires input and participation from the project leaders of Architecture 122, Transformation Management 136, Business Process 112, EDI 114, and Application Development 116.

Assessment 101 begins with a complete review of the client's current general procurement and accounts payable processes. This includes debriefing the initial marketing team 118, instructing the project leaders 126, and accumulating all other relevant data available about the client's processes, tools, and organizational structures. The Assessment Team then defines an integrated customer solution that covers technical, educational, and Human Resource issues.

The delivery of the Workshop is intended to present an overview of the customer solution, initiate discussions on process analysis and strategic implementation, and confirmation of the solution fit. Specific goals of a workshop phase within assessment stage 101 include the following:

(1) Prepare and deliver a presentation to the customer defining the service offering, including any essential documentation on the offering, and a demonstration of the end-user tool(s), as applicable.
(2) Collect area specific information and customer requirements on network process sourcing, procurement, accounts payable, and finance; and EDI, I/T, and transition management.
(3) Identify high level gaps in each such area.
(4) Identify additional high level requirements for new process support, and for conversion requirements, including requirements for commodity structure, account structure, vendor, and contracts.
(5) Identify interface requirements, including requirements for HR, cost center, catalogs, ledger, information warehouse.
(6) Validate accounting for project, appropriation, contract, job, tax reporting, currency, and check reconciliation.
(7) Identify requirements for network, EDI, testing, and application development including new reports, new interfaces, and new features.
(8) Assemble a high-level gap analysis.
(9) Create a high-level Customer Scope Document.
(10) Confirm the recommended solution.

At the completion of the workshop phase, the assessment team 106 convenes to develop and cost the final customer solution and proposal. At this time, the members of assessment team 106 assemble, understand, and validate the collected data; review standard proposal options with assumptions and identify items that apply to this client; create a draft of the proposal including scope, risk, schedule, and resources; review the draft with team and other project members to obtain sizing and costing information for each area; compile costing information to add to the proposal; and perform QA review of the system integration, application development, managed operations (including service delivery center (SDC), application IT, and Process Operations) proposals, and of the overall proposal.

The resulting proposal is delivered or presented to the client. Final Assessment activities include follow up query responses and, should the proposal be declined, a loss analysis. This loss analysis feeds back into assessment process 101 to improve its overall effectiveness and efficiency.

Referring to Table 4, summary tasks pertaining to assessment stage 101 are listed, together with included detail tasks. For each task, a template 440 or 520 is maintained in data base 70, and accessed by team 108 members and others through summary view 400 to track progress (including viewing, updating, sharing, and approving) during this assessment stage 101.

Project Preparation 102

Referring further to FIG. 3, project preparation stage 102 sets up the project, initializes detail planning, and models the plan for making the transition from the client's legacy system and process to the new system and process (or, offering).

A critical element of this stage is to ensure resources are assigned to transition management 136, both from the project implementation team 126 as well as from the client. During this stage the transition activities required for a smooth migration from the old client process and system to the new service offering are modeled. The result is a detailed transition management plan that is specifically designed for the client. Stage 102 tasks and deliverables include the following:

(1) Perform analysis on the client HR environment, including organization structure and relationships, labor relations, management, administration, and end user roles and responsibilities, and the general HR environment.
(2) Develop and approve the detailed transition management and communication plan.
(3) Update the client specific transition management strategy.
(4) Define the quality assurance (QA) process required to assure that a project conforms to documented standards and meets documented requirements. The purpose of this task is to confirm the quality assurance standards between Enterprise and the client, and identifies the tasks that are to be audited by the Enterprise Technical Center.

The QA review is a beneficial process for the project as it timely recognizes potential risk areas and reduces the possibility of project delays while achieving faster implementation, attaining low cost and increasing the customer's level of confidence. Deliverables of the QA review task include the following:

(1) Confirm and refine quality assurance standards with the customer.
(2) Confirm that technical requirements can be met.
(3) Confirm that business and financial measurements can be met.
(4) Confirm that the proposal is complete and the required processes have been followed.
(5) Establish QA schedule for the project.

Integration of all critical Enterprise and client team members provides the glue to assure a smooth project. By completing the detailed tasks within project preparation stage 102, the recommended implementation standards, procedures and strategies for the project are shared with the technical and business functional members of the project team as well as with the customer. All team members have input in this process, and understand the basic procedures, once they have been agreed to. These procedures, documented in summary and detail task templates listed in Table 4, include the following:

Configuration Standards
CR/PTR Process
Testing Strategy
Production Support and Operations Strategy
SAP System Management Strategy
Req/Cat System Management Strategy
Network Computing Strategy
Vendor Conversion Strategy Project Design and Development 103

Referring further to FIG. 3, project design and development phase 103 provides and documents in a database of templates referred to as a Playbook, the business controls, transformation management, and SAP and Req/Cat customization required for an integrated approach to a complete customer solution.

During this stage 103, business controls 132 provides a comprehensive process that identifies key control points and establishes detailed procedures to assure a quality installation. The deliverables include documentation, separation of duties, sensitive programs, logical access control, logging (audit trail), change control for tables, change control for programs, system testing, input controls, processing controls, error handling controls, output controls, balancing and reconciliation, vital records and disaster recovery, records management, reports, local area network (LAN), and country specifics, as described below:

(1) Documentation: an assessment of the quality and completeness of existing program documentation and a determination of the degree to which programs could be efficiently reconstructed if they were destroyed.
(2) Separation of duties: the duties of the programmer, computer operations, and user groups are reviewed to ensure that separation of duties problems do not exist. No one individual can control activities within a process (or any event in a string of events) in a way that permits errors of omission, or commission of fraud, theft, etc., to go undetected.
(3) Sensitive programs: controls must be in place to prevent unauthorized modification and/or use of the application.
(4) Logical access control: while programs are generally controlled by a site procedure, application data has a formal access control mechanism.
(5) Logging (audit trail): a logging mechanism is established to ensure the audit trail is correct.
(6) Change control (tables): a change control system is put in place to evaluate, justify and control changes to tables.
(7) Change control (programs): a change control system is put in place to evaluate, justify and control changes to programs.
(8) System Testing: system testing procedures are effectively planned and carried out to ensure that controls are successfully tested and documented.
(9) Input controls: to insure accuracy and completeness of information entering an application.
(10) Processing controls: controls are applied for entry of data into the computer application system that ensure accuracy and completeness of data during computer processing.
(11) Error handling controls: controls for error handling and reprocessing of transactions.
(12) Output controls: output controls ensure the integrity of the output data from conclusion of computer processing to delivery to the user.
(13) Balancing and reconciliation: verifies that procedures to reconcile output to input are effective.

(14) Vital records and disaster recovery: disaster recovery is designed to provide for the continuity or rapid system restoration of a business process immediately following a natural or man-made emergency or disaster.
(15) Records management: verify that information is managed with sound business practices and controls.
(16) Reports: verify that reports are distributed properly.
(17) Local Area Network (LAN): Refer to ITCS 201, "Security Standards for Local Area Networks and Distributed Computing."
(18) Country specifics: verifies that any questions particular to this specific country are completed.

Req/Cat is a requisition and catalog product designed, developed, and maintained by Enterprise for use in systems such as those developed in this stage 103.

SAP is an financial and accounting package which an enterprise or company may license for its own use and for its customers. SAP configurators that customize package programs to fit the needs of the client are provided for use during design and development stage 103. All other installations of SAP are "off the shelf", with the client changing its internal structures to fit SAP requirements.

Transition management is the most overlooked part of any implementation process. It is critical to address the corporate culture and personality at the earliest contact. Strategic and tactical plans may then be developed that guide the implementation through "Go Live" and for an agreed period thereafter. The purpose of transition management steps of the design and development stage 103 is to provide guidance to the development team members as they work with the client to institute policy changes that might be introduced as part of the implementation of the new process and system. Necessary changes to the legacy system are identified and a plan developed to announce and introduce changes in policy. Policy change includes key business rules that are part of the management system for purchasing and procurement. They may be associated with approval levels or procedural changes in the new system. The target is not the day to day operation but management decision and support systems that might be affected. The areas addressed include:

Measurements (old and new)
Management system
Approval levels
Supplier contacts and contracts
Reward systems
Incentive Plans
Security
Employee and user changes All of these areas require strategic and tactical planning that includes the following steps:
(1) Identify the current (legacy) system or process and compare it to the new process or system to be implemented to identify gaps.
(2) Develop specific recommendations for gaps between the legacy and the new system or process, identifying the level of sensitivity and whether or not action is required as part of the transition.
(3) Determine the announcement and transition (or, cut over) date for each action identified.
(4) Design a communications plan to build the message and media for communicating the changes to affected parties.
(5) Design a process transition plan to ensure the elements of change are integrated into the overall plan for the process.
(6) Determine how the policies must be modified according to new standards and procedures
(7) Determine what new policies and procedures will be implemented as part of the process and system.

Finally, integration of the above design and development stage 103 process steps along with the technical teams involved allow the delivery of a cross-functional solution under one unified and managed plan.

Project Deployment 104

Referring again to FIG. 3, project deployment phase 104 uses the Playbook to improve deployment of (1) quality, or application systems control and auditability (ASCA), (2) transition management, and (3) integrated project management systems and procedures.

1. Quality (ASCA)

A business controls team provides dedicated resources throughout the life cycle of the project. During the project development stage 103, this team has planned and executed an ASCA self-assessment that has covered an extensive list of technical, business, financial, and client issues. In this deployment stage 104, its members are responsible for managing an independent audit that will cover the same areas. The independent auditors then issue an acceptance position that is required before the client can "Go Live" with the new system and process. Deployment stage 104 activities include:
(1) Create the project plan for ASCA Review preparation activities.
(2) Determine which Enterprise organization will conduct the ASCA and business controls review.
(3) Prepare all ASCA documentation required for the review.
(4) Prepare all sub-process overviews and descriptions of process flow.
(5) Ensure the test plan includes those elements of the ASCA checks required to ensure business controls, separation of duties, and authorization matrices, data integrity and security.
(6) Create, update and complete all required documents of understanding (DOU's) & service level agreements (SLA's).
(7) Ensure the separation of duties matrix (SOD) is current at time of final review.
(8) Review all testing and obtain test approvals.
(9) Ensure all approvals have been obtained and signed approval forms available for ASCA Review. These include approvals for process ownership, ASCA requirements, self-assessment and system cutover.

2. Integrated Prolect Management

During this deployment stage 104, project manager 126 has the task to validate and confirm that all checklists and status are acceptable prior to Go-live. This includes the readiness of all aspects of the project, and once satisfied, a review is conducted and the customer's formal sign-off for Go-live is obtained. Status transition management and client readiness assessment and confirmation activities include verification that:
(1) No critical open issues exist in any area.
(2) All relevant aspects of readiness have been included in the status check.
(3) Network and computing performance testing is complete.
(4) System test is complete.
(5) User acceptance test is complete.
(6) System management production environment Go-live checklist is complete.
(7) Any needed CR's and PTR's have been generated.
(8) Production support is in place.
(9) Supplier readiness is reviewed and accepted.

(10) Service provider readiness is confirmed.
(11) Enterprise GP readiness is confirmed.
(12) Review of the compiled check information is completed.
(13) Customer sign-off on the Go-Live decision is obtained.

3. Transition Management

A transition management team prepares for the deployment, or "Go Live" of the client solution. During this deployment stage 104 in the project, virtually all technical problems are resolved and systems configured. The client is now ready to deploy and the human factors must be aggressively managed to assure a smooth transition from the legacy systems to the improved client solution. Transition management activities within deployment stage 104 ensure that organization, measurements, management, support, and labor relations functions are developed, explained, reviewed, understood, in place or on schedule, as appropriate.

(1) Organization: organizational changes for Go-Live, updated communications plans, feedback mechanism for persons displaced by changes in organization, and the new organization.
(2) Measurements: changes in measurement system, plan to cut over to the new measurements, and communications explaining the new measurements, including how they are derived, how they are used and their importance to the business.
(3) Management: changes in management or management responsibilities, communications explaining the changes in management structure, and why it is important to the clients' organization, the management chain and path for escalation of issues, normal business reports and their use.
(4) Support: support structure for both client and technical support.
(5) Labor Relations: activities associated with the loss of a job role, plan to notify the affected people, communication plan for providing information to remaining employees on the reasons for the changes and for fostering support for the new process.

Integration of the cross-functional teams to accomplish the deployment of the customer solution is facilitated by use of the system and data base structure of the preferred embodiment of the invention.

Ongoing Project Support 105

Referring further to FIG. 3, project support stage 105 enables project teams, all of which have continuing responsibilities with the client after "Go Live", to provide the required ongoing support. As with all other stages, integration of the teams through the use of the systems and methods provided by the invention, including transition management systems and methods, is greatly facilitated. It is a characteristic of the preferred embodiment that each of these areas has specific predetermined plans, actions and responsibilities, and these are audited and tracked through a GP/AP development and deployment system.

During support stage 105, transition management 136 delivers an approved detailed questionnaire with quality questions in a logical format that allows end-users to express their opinion and provide information that meets the survey objective. Support stage 105 includes a plan for communicating the survey results to the participants and taking action in response to the survey results. This stage also incorporates a continuing education plan for training new employees as well as continually updating the material so that reflects the latest version of the application.

The survey in stage 105 is structured to determine the end users' perception of the new system, system ease of use, response time from both the system and CSC (Customer Service Center), and customer knowledge level of processes and product. Results of the survey are compiled and presented to the client and Enterprise Management Teams along with action plans, time tables, expected results for approval, and implementation. A Lessons Learned document is reviewed with the project team and appropriate adjustments made for future engagements.

Project Manager 126 provides a quality function task after "Go Live". This task aims at checking the implementation of the EPS Offering to determine if anything needs special attention or focus. It is also the formal sign-off on the final delivery of the implementation by the customer. Its deliverables include:

(1) Customer accepts delivery of the EPS general procurement offering implementation and signs off.
(2) Action list on issues and CR/PTR's, if applicable.
(3) Formal transition of operational responsibility to operations 98 and support management 96.
(4) Preliminary business benefits evaluation.

The Req/Cat and SAP technical teams 128, 138 provide ongoing reviews and improvements to the client's process through the CR and PTR processes. These are formalized, documented processes with management controls to attain cost, schedule, and customer objectives.

As part of the new business process, support center 94 is established to provide long term assistance in any area of the application solution. This includes communication of feedback, real time application assistance, and special requests for problems concerning data.

It is the planned integration of these multi-functional teams that provides an innovative solution to the customer.

Representative Path Implementation of Project Development Stage 103

Referring to FIGS. 3C, and 3F–3M, a series of steps illustrating an exemplary path through project development stage 103 will be described.

While steps 190–198, and 250–354 represent a path through development stage 103, other summary and detail tasks designated in Table 4 as pertaining to stage 103 are typically included in the initial set of templates for this customer, and are also used as they are determined to be applicable. Some field entries are dynamic and changeable during the course of project development stage 103. The templates are also editable for a particular project, and do not necessarily continue during use to conform to the original format.

In step 190, the Education team accesses detail task template P412 in the course of defining training requirements and approach. Template P412, Table 12, provides, either directly or by way of links to other documents, instructions, flow charts, sample questionnaires, report models and checklists for guiding, coordinating and documenting the work of the team through the steps for doing so, which include (1) customer E&T requirements defined, (2) customer specific process and training requirements defined and approved, (3) E&T approach defined and agreed to with the customer, (4) E&T deliverables defined and agreed to with the customer, (5) end-user documentation plan defined and approved, and (6) E&T strategy document completed and ready for customer review.

TABLE 12

DETAIL TASK: DEFINE TRAINING REQUIREMENTS AND APPROACH

CREATION STATUS

| | |
|---|---|
| Category: | Education and Training |
| Team: | Education (Req/Cat, SAP) |
| Offering type: | Req/Cat, SAP, Req/Cat&SAP |
| Stage: | 2. Project Preparation |

IMPORTANCE BUTTONS

| | |
|---|---|
| Education: | Yes |
| Certification: | Yes |
| Auditable: | Yes |
| Critical path: | No |

IMPLEMENTATION

| | |
|---|---|
| Executed by: | Service Provider |
| Performed by: | Education & Training Specialist |
| Priority: | High |
| Work effort: | 10 days |
| Sequence: | Six months prior |

DETAIL TASK DETAILS

Description:

Having identified the customer's objectives, goals, and commitment level for E&T, you can know provide a initial strategy for how to approach and provide end-user training for that customer. The information collected in this task will provide the core documentation for the E&T strategy document. Within this task we will identify, at a preliminary level, the following items:

customer user audience(s) and knowledge levels
the logistical location of users
the existing and desired support structure
customer specific processes and requirements
By combining the above findings with the results from Detailed Task titled Validate Customer Education & Training Objectives —>
the targeted training approach can be defined.
Prerequisites:

Customer E&T Objectives and Commitment Level Defined
Task steps:

1. Define the Customer Training Requirements and Scope
2. Establish client expectations and agreement to the best approach for meeting the education needs.
3. Identify Customer Specific Processes for Training.
4. Identify the Targeted Training Approach
5. Define the education deliverables
6. Develop an end-user documentation plan
7. Compile E&T Strategy Document
Add the collected information to the E&T Strategy Document . . .
Deliverables:

Education & Training Strategy Document sections for:

Customer training requirement
Customer specific process and training requirements
Training approach defined and agreed to with the customer
E&T documentation deliverables agreed to with the customer
End-user documentation plan defined
E&T Strategy Document completed and ready for customer approval
Methodology attachments:

Education and Training Strategy =>

The methodology attachment provides a guide to developing the education and training strategy and plan necessary to implement the REQ/CAT—SAP system and process at the client location. It is expected this document will be used by service providers to guide the development and implementation of all training plans associated with a client engagement.

Critical to success is the validation of the client education and training objectives and the determination of specific training requirements and approach. Early in the client engagement it will be necessary to assess the readiness of the user community to accept the new system and process from an education perspective.

Clients have a wide range of options when it comes to developing and deploying an education plan. These range from simply providing access to a web based education program for sophisticated users to stand up lecture for the uninitiated users or users that are not computer literate. This strategy suggest that it is important to determine early in the stage what type of education delivery will be used by the client or whether or not multiple delivery methods will be used.

In order to define an effective education and training program for a client, the customer's objectives and goals are for training must be understood. This is key as the training level, commitment, and objectives will vary widely depending on the customer. Validating, up front, the customer's objectives, desired approach, commitment level, support structure, and time restrictions will enable the definition and creation of an effective training program that is appropriate for that customer.

In step 192, the education and training specialist accesses summary task template P43 and subsidiary detail tasks in the course of validating and defining the details around the customer's end-users, the courses, the documentation, and general training organization. The subsidiary tasks are accessed to define customer user audiences and requirements, confirm user documentation requirements and standards, conduct detailed end-user task analysis, assess user skills and training needs, validate end-user courses and content, identify users and course attendees, and define and notify training attendees. Templates P43–P437 provide, either directly or by way of links to other documents, instructions, flow charts, sample questionnaires, report models and checklists for guiding, coordinating and documenting the work of the education specialist through these steps.

In step 194, the education team accesses detail task template P443 in the course of setting up a system training environment specific to the system in preparation for the user training sessions. Template P443 provides, either directly or by way of links to other documents, instructions, flow charts, sample questionnaires, report models and checklists for guiding, coordinating and documenting the work of the education team through the steps for doing so, as illustrated in Table 13.

TABLE 13

DETAIL TASK: SETUP TRAINING SYSTEM ENVIRONMENTS

DETAIL TASK DETAILS

Task steps:

The future system production environment is simulated in the training environment. Prepare the training environment by considering the following:
1. Hardware Components
2. Software Components
3. Logon Access and Security
4. Set Up Training Data and Refreshment Procedures In step 196, the education team accesses detail task template P446 in the course of arranging for the production, reproduction, and packaging of end-user documentation and training material to deliver to the client. The deliverables were defined when the Education & Training Strategy was prepared. Deliverables could also include any on-line files, site accesses, file transfers, etc. that the customer will need to conduct the training courses. Template P446 provides, either directly or by way of links to other documents, instructions, flow charts, sample questionnaires, report models and checklists for guiding, coordinating and documenting the work of the education team.

In step 198, the education team accesses detail task template P445 in the course of validating that the user training meets the objectives by conducting, at a minimum, an abbreviated pilot training course with the customer super users. The pilot training covers the basics of the training course including: material layout and format, training structure and approach, class flow and objectives, and material usage (for training and reference). Template P445 provides, either directly or by way of links to other documents, instructions, flow charts, sample questionnaires, report models and checklists for guiding, coordinating and documenting the work of the education team through the steps for doing so, including (1) determining the scope of the pilot test, (2) determining what data to collect and how to collect it, (3) producing test level training courseware and materials, (4) conducing pilot training, and (5) analyzing results and revising training materials as appropriate.

In step 250, the SAP team accesses summary task template PB1 in the course of applying the Offering package to the future business model, and identifying the level of fit and the level of gap, so that configuration design issues can be resolved. The functionality options from SAP that support the solution are chosen. In preparation for configuration activities, key package data elements (master data) to be loaded into the system are chosen and the SAP hierarchy structure to support the customer organization is determined. The offering's golden package is mapped to the client's target business processes at both a functional and data level of detail. The transactions, menu paths, tables, and standard reports from the golden package that are required to fulfill each functional and sub-functional requirement are identified. Requirements that the package cannot meet are identified and alternate solutions offered. Finally, the project plan is reviewed and updated. Knowledge gained regarding project requirements is likely to impact the project scope. Template PB1 and subsidiary detail tasks templates provide, either directly or by way of links to other documents, instructions, flow charts, sample questionnaires, report models and checklists for guiding, coordinating and documenting the work of the SAP team.

In step 252, the SAP team accesses summary task template PB3. The purpose of this task is to configure SAP with specific items and information that are definable for each Customer. These changes represent the 20% of the SAP Solution which is defined and changed by the service provider. Although these are definable by the service provider and do not represent a change to the Golden configuration, they still require a change request (CR) to be created in order to document and track the customer configuration. Code changes to the Golden configuration represent the 80% of the SAP Solution and are standard defined. These changes are also referred to as customization changes, and require a change request.

Template PB3 and subsidiary detail task templates provide, either directly or by way of links to other documents, instructions, flow charts, sample questionnaires, report models and checklists for guiding, coordinating and documenting the work of the SAP team through the steps for configuring a SAP offering.

In step 254 SAP requirements definition, the menu and navigational paths, with reference to various templates including summary task PB1 and subsidiary detail tasks, the transactions and standard reports which will fulfill the business processes and functions as described in the future model are identified, as are key tables and configurations.

In step 256, the testing team accesses summary task template PC1 in the course of creating a comprehensive testing plan. Template PC1, Table 14, provides, either directly or by way of links to other documents, instructions, flow charts, sample questionnaires, report models and checklists for guiding, coordinating and documenting the work of the team through the steps for doing so.

TABLE 14

SUMMARY TASK:
PERFORM PREPARATION ACTIVITIES FOR TESTING

CREATION STATUS

| | |
|---|---|
| Category: | Testing |
| Team: | Testing |
| Offering type: | Req/Cat, SAP, Req/Cat & SAP |
| Stage: | 3. Design & Development |

IMPORTANCE BUTTONS

| | |
|---|---|
| Education: | Yes |
| Certification: | Yes |
| Auditable: | Yes |
| Milestone: | Yes |
| Critical path: | No |

IMPLEMENTATION

| | |
|---|---|
| Executed by: | Service Provider |
| Performed by: | Test Manager |
| Priority: | High |
| Work effort: | 60 days |
| Sequence: | Four months prior |
| Support Resources: | Architect, Configurator, Application Developer, Procurement Analyst, Accounts Payable Analyst, Network Specialist |

SUMMARY TASK DETAILS

Description:

This summary task incorporates the activities required to complete a comprehensive, detailed Testing Plan that encompasses all levels of testing listed in the Testing Strategy. In addition, develop plans for setting up the Test Environment across the testing levels, develop Test Case Specifications and Test Cases.

The following tasks are performed:

Detail and supplement the testing strategy to prepare a single, comprehensive testing plan that defines the objectives and scope, test method and procedures, starting and completion criteria, test organization, and test schedule for all levels of testing.
Prepare detailed plans for setting up, coordinating, and maintaining the testing environments and facilities that will be used for incremental development, assembly and testing of the system components and integrated system and system interfaces.
Verify the comprehensive test plan with all interested parties.

Deliverables:

Test Case Template
Comprehensive Test Plan
Test Environment Plan
Functional area Test Coverage Matrix
Test Case Specifications
Test Tools Specifications In step 258, the testing team accesses detail task template PC 12 in the course of building a comprehensive test plan. Template PC12, Table 15, which is also accessed during step 326, infra, provides, either directly or by way of links to other documents, instructions, flow charts, sample questionnaires, report models and checklists for guiding, coordinating and documenting the work of the test manager through the steps for doing so, including (1) confirming and refining the test objectives, strategy, and scope for each level of testing, (2) defining the testing administration and control procedures for each level of testing, (3) reviewing and refining the test team organization component of the testing strategy, (4) detailing the testing schedules for each level of testing, (5) assembling all the comprehensive test plan components and verifying that the plan is complete and ready for verification.

TABLE 15

DETAIL TASK: BUILD COMPREHENSIVE TEST PLAN

DETAIL TASK DETAILS

Description:

The purpose of this task is to implement the ground rules laid down in the Test Strategy document. The Comprehensive Test Plan supplements the Test Strategy based on the External and Internal Design Specifications and Test Case Specifications work.
It confirms the testing objectives, focus areas, and scope of testing, and details the procedures, starting and completion criteria, required testing resources and organization, testing schedule, and acceptance procedure for each level of testing.
Prerequisites:

Testing strategy
Test Cases Specifications
Test Environment Plan
System Architecture
Application Development Plan
Bridge Control Point Matrix
Process Control Point Matrix
Customer Specific test requirements
Task steps:

Complete and detail the test planning for each of the levels of testing specified in the Testing Strategy. Perform the following steps:
Confirm and refine the test objectives, strategy, and scope for each level of testing.
Make sure these components of the testing strategy are still complete and agree with the external and internal design specifications.
Clarify the objectives of that testing level as part of the overall process of removing defects.
Clarify the scope of business and technical functions and features to be tested.
Clarify the types of tests to be conducted and the structure of the test cases.
. . .
Assemble all the comprehensive test plan components and verify that the plan is complete and ready for verification.
Deliverables:

A Comprehensive Test Plan detailing:

TESTING METHODS
ENTRY/COMPLETION CRITERIA
TEST RESOURCES AND SYSTEM
TEST SCHEDULE
ACCEPTANCE PROCEDURES
Methodology attachments:

Sample of a Comprehensive Test Plan —>

In step 260, SAP customer review and transports, a user acceptance test, using summary task template PC1 and subsidiary detail tasks, is developed for demonstrating the newly developed system to the client's user community, validating its operability in actual application, and obtaining final approval. The acceptance testing is conducted in the client's operating environment, or one that closely simulates that environment, and verifies that the system meets user requirements as specified. After the client has accepted the results of the system test, SAP is transported to the production environment.

In step 262, the testing team accesses detail task template PC22 in the course of performing the component test. The purpose of Component Testing is to test the configured, customized SAP "Golden Configuration", the customized e-Req/Cat configuration, the customized Image configuration and standard reports, as identified in the test plan. The end result of component test is to provide thoroughly tested system into which the bridges, gaps, and extensions, modifications, and/or custom reports can be integrated. At this stage, testing takes place on the QA system. A subset of test cases used for this component test will be used as part of the follow-on testing base for use in Integration, User Acceptance and/or System Test. Component testing uses mainly a black box method (data driven or input/output driven testing). Template PC22 provides, either directly or by way of links to other documents, instructions, flow charts, sample questionnaires, report models and checklists for guiding, coordinating and documenting the work of the testing team through the steps for doing so, including (1) executing component test cases by test team, (2) tracking and documenting component test results, including obtaining signoffs, (3) classifying and filing component test cases for reuse, (4) performing analysis on major errors of component test, and (5) reviewing signing off on component testing.

In step 264, the testing team accesses detail task template PC23 in the course of performing the integration test. Template PC23, which is also accessed in step 328, infra, provides, either directly or by way of links to other documents, instructions, flow charts, sample questionnaires, report models and checklists for guiding, coordinating and documenting the work of the testing team through the steps for doing so as listed in Table 16.

TABLE 16

DETAIL TASK: PERFORM INTEGRATION TEST

| CREATION STATUS | |
|---|---|
| Category: | Testing |
| Team: | Testing |
| Offering type: | Imaging Implementation, Req/Cat Implementation Only, SAP Implementation Only, SAP & Imaging Implementation, Req/Cat & Imaging Implementation, Req/Cat & SAP Implementation, SAP & Imaging Implementation |
| Stage: | 3. Design and Development |
| IMPORTANCE BUTTONS | |
| Education: | Yes |
| Certification: | Yes |
| Auditable: | Yes |
| IMPLEMENTATION | |
| Executed by: | Service Provider |
| Performed by: | Tester |
| Support Resources: | Accounts Payable Analyst, Application Developer, Business Controls Analyst, Configurator, Customer, EDI Specialist, Image Admin, Ledger Expert, Procurement Analyst, SAP Admin, Vendor Group Specialist, Req/Cat Admin |
| Priority: | High |
| Work effort: | 510 days |
| Sequence: | 3 months prior |

TABLE 16-continued

DETAIL TASK: PERFORM INTEGRATION TEST

DETAIL TASK DETAILS

Description:

Integration Test validates the Integrity of the Offering in the Client's integrated environment by testing a chain of Business Processes which flow together, including interfaces to legacy systems, testing of conversion programs, custom developed reports, system hardware, and software.
This is the test level where the applications development work is integrated with the process definition and system customization.
Integration test includes the testing of all Control Points directly related to, or supported by, the bridge/interface being tested, including any and/all control reports.
Integration test takes place on the QA system and uses mainly a black box method (data driven or input/output driven testing).
Prerequisites:

Unit and Component Tests are complete.
Test coverage matrix and fully documented test cases are available and approved by the project test team
All system configurations and programs are successfully transported to the QA system.
Bridge configuration and setup is completed by Systems Management Team, as required.
Production data or similar is available for use during Integration Test.
Task steps:

1. Execute Integration Test Cases . . .
2. Track Integration Test Results . . .
3. Classify and File Integration Test Cases for Reuse
4. Perform Analysis on Major Errors of Integration Test
5. Obtain sign-off from Customer, Test Manager, and Business Controls Representatives
Deliverables:

A Major Errors Analysis Report and Action Plan which contains the evaluation of the causes of major errors, and recommends actions that will prevent recurrence of similar errors.
All test cases have been executed and errors identified.
All Severity 1&2 errors have been corrected and regression tested.
All Severity 3&4 errors have been identified with action plans and dates for closure.
Test results have been reviewed and approved by the Customer, Test Manager and Business Controls (ASCA Team).
Methodology attachments:

Sample of a completed Integration Test Case —>
Sample of Control Points Matrix (Bridges) —>

In step 266, the testing team accesses detail task template PC25 in the course of performing the system test. The purpose of System Testing is to test the complete system for all Business Functions and Business Control Points to satisfy the acceptance criteria prior to production cutover. System test takes place on the QA System and uses mainly a black box method. Template PC25, which is also accessed in step 330, infra, provides, either directly or by way of links to other documents, instructions, flow charts, sample questionnaires, report models and checklists for guiding, coordinating and documenting the work of the testing team, supported by Accounts Payable Analyst, Application Developer, Business Controls Analyst, Configurator, Customer, EDI Specialist, Image Admin, Ledger Expert, Procurement Analyst, SAP Admin, Vendor Group Specialist, and Req/Cat Admin, through the steps for doing so, including (1) executing system test cases, (2) running regression test, (3) identifying severity 3 & 4 errors, (4) documenting system test results, (5) reviewing system test results, and (6) obtaining sign off for system test.

Figure 3G:
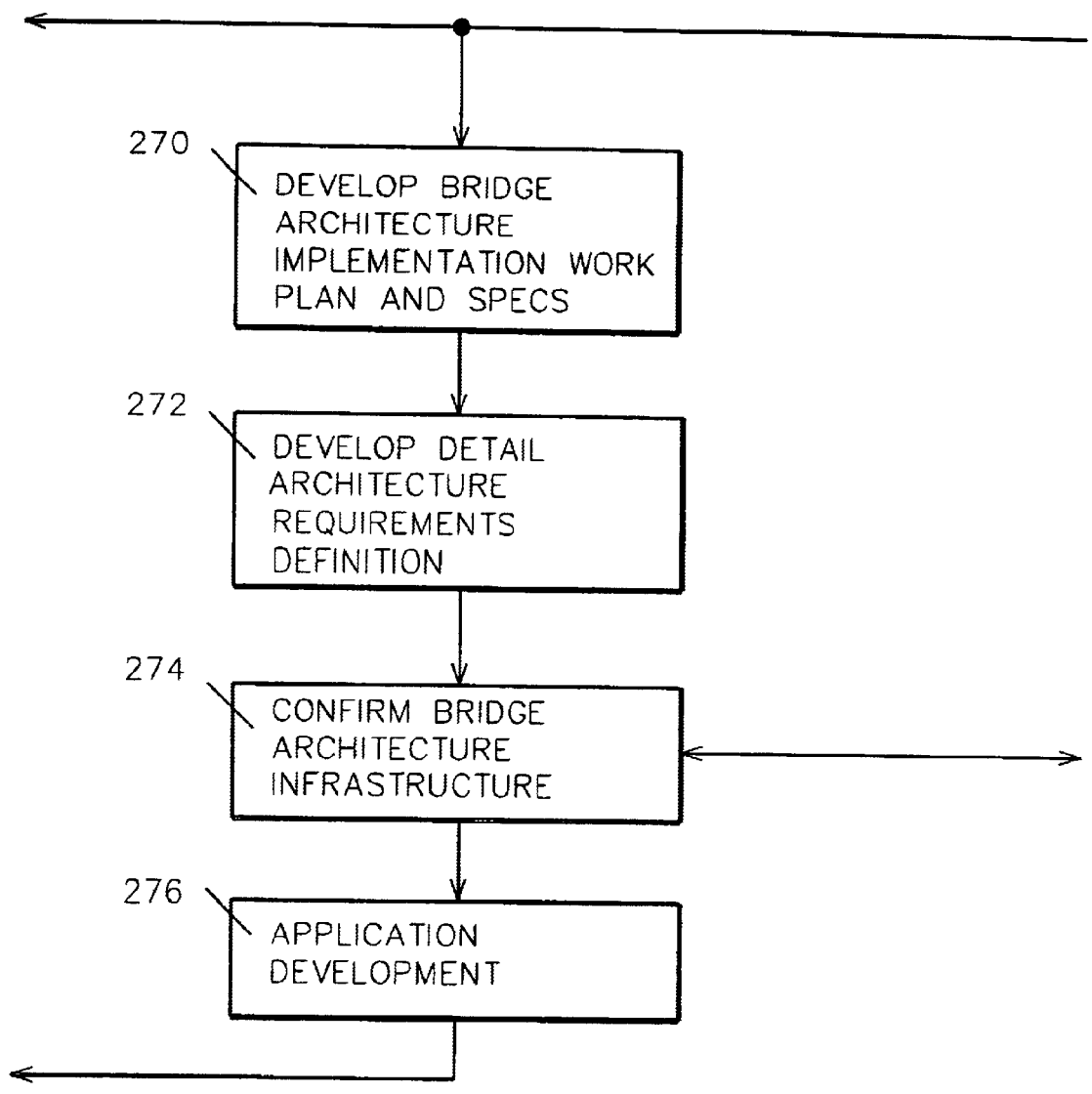
Figure 3H:
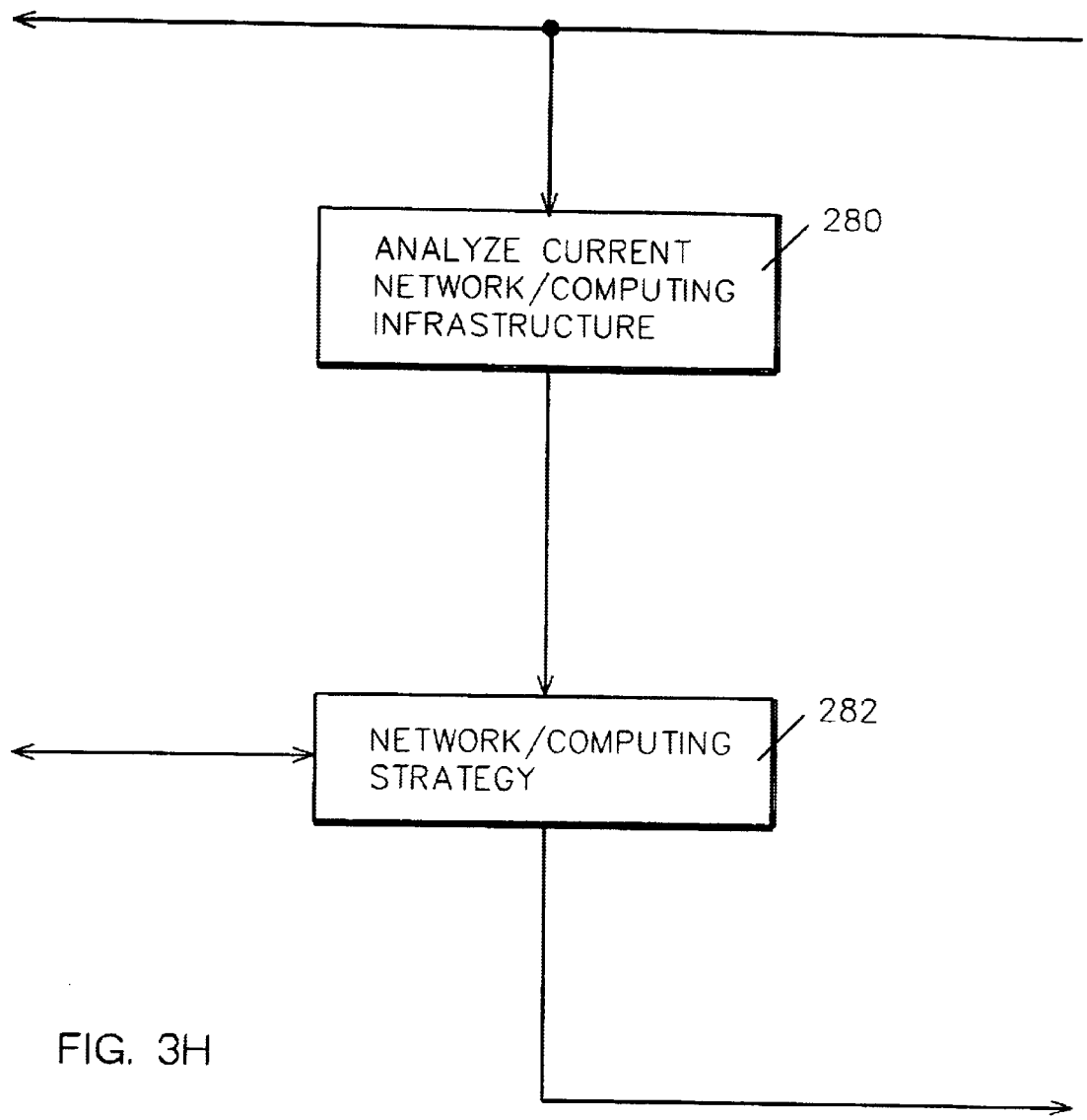
Figure 3J:
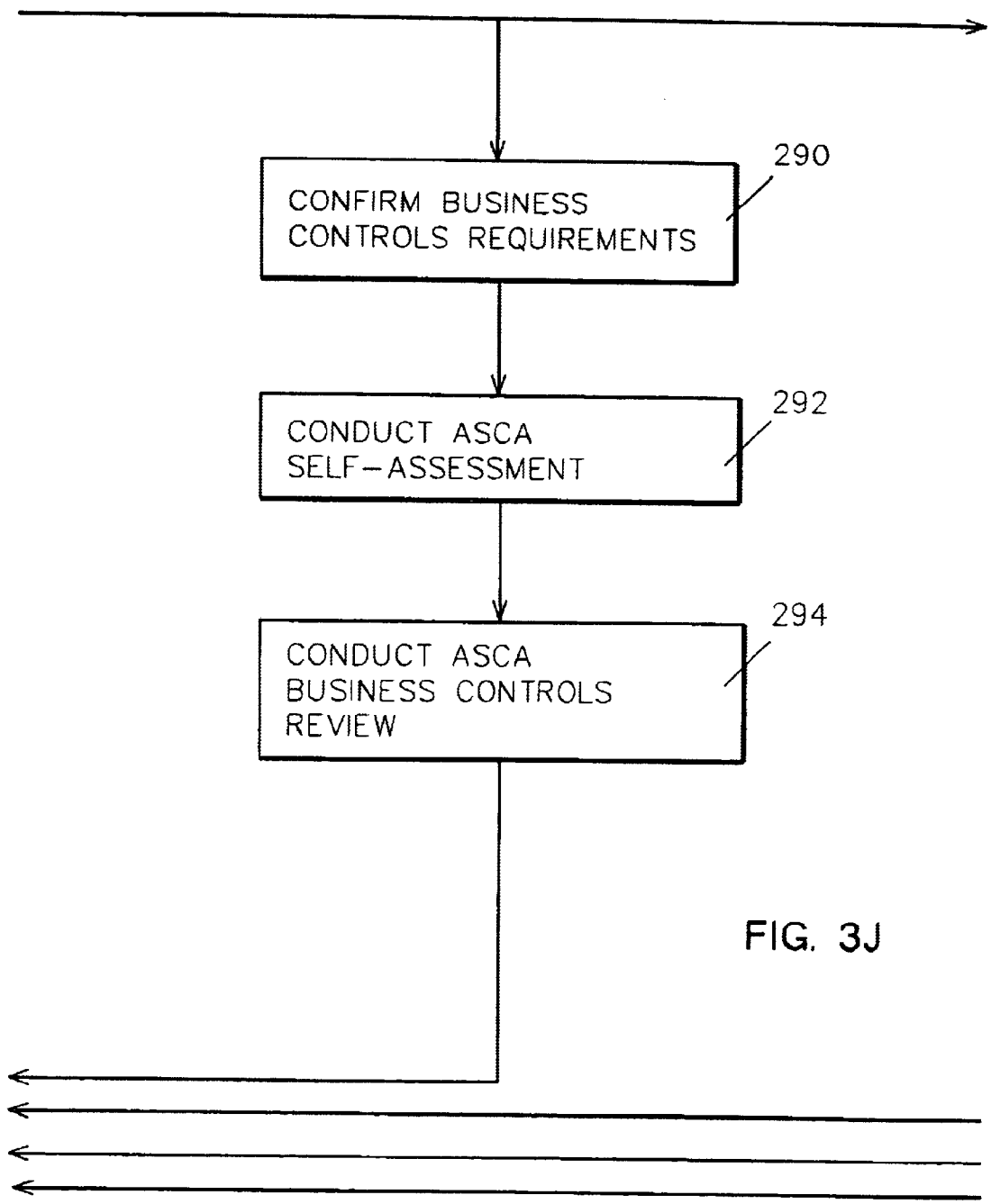
Figure 3K:
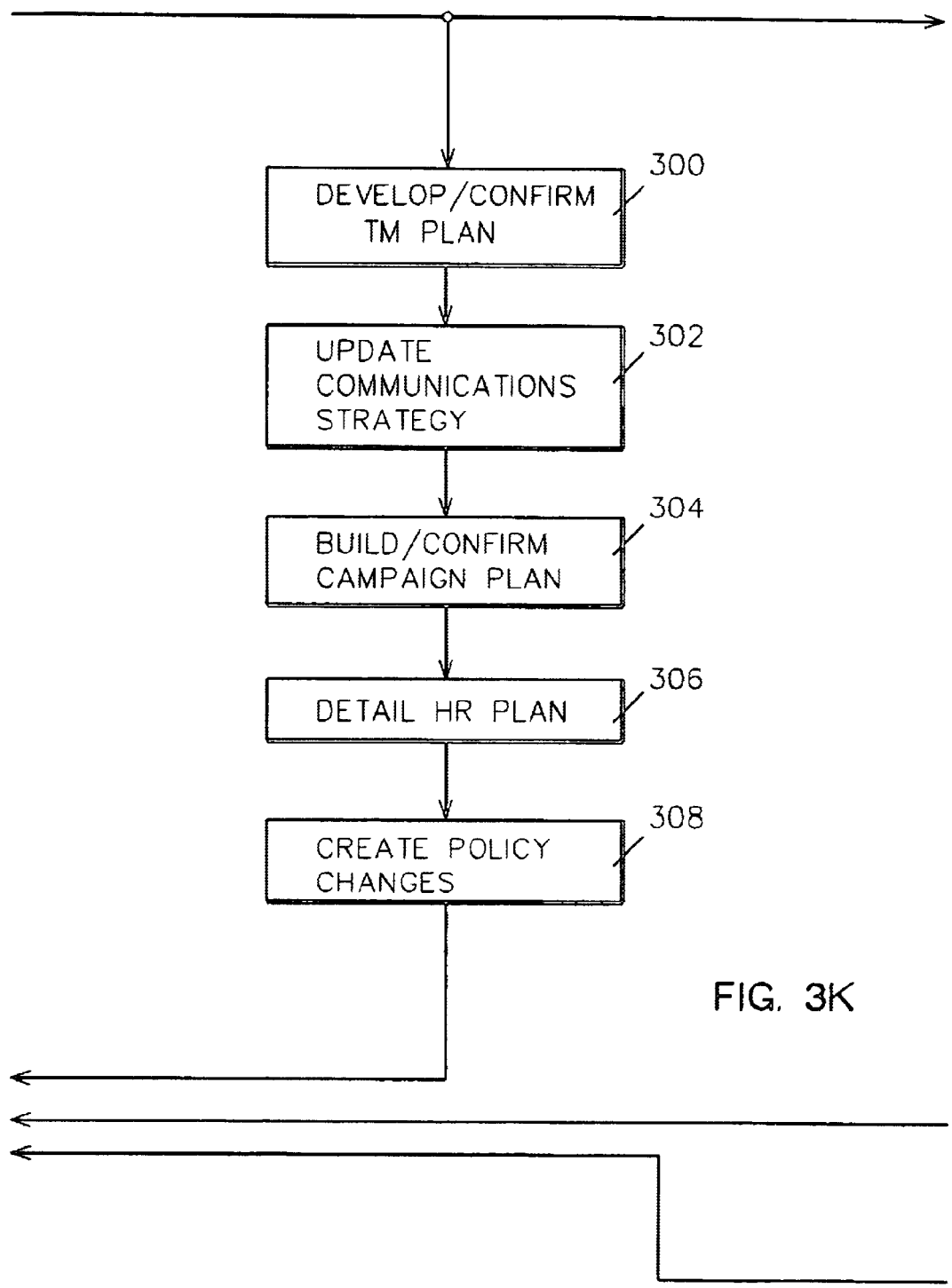
Figure 3L:
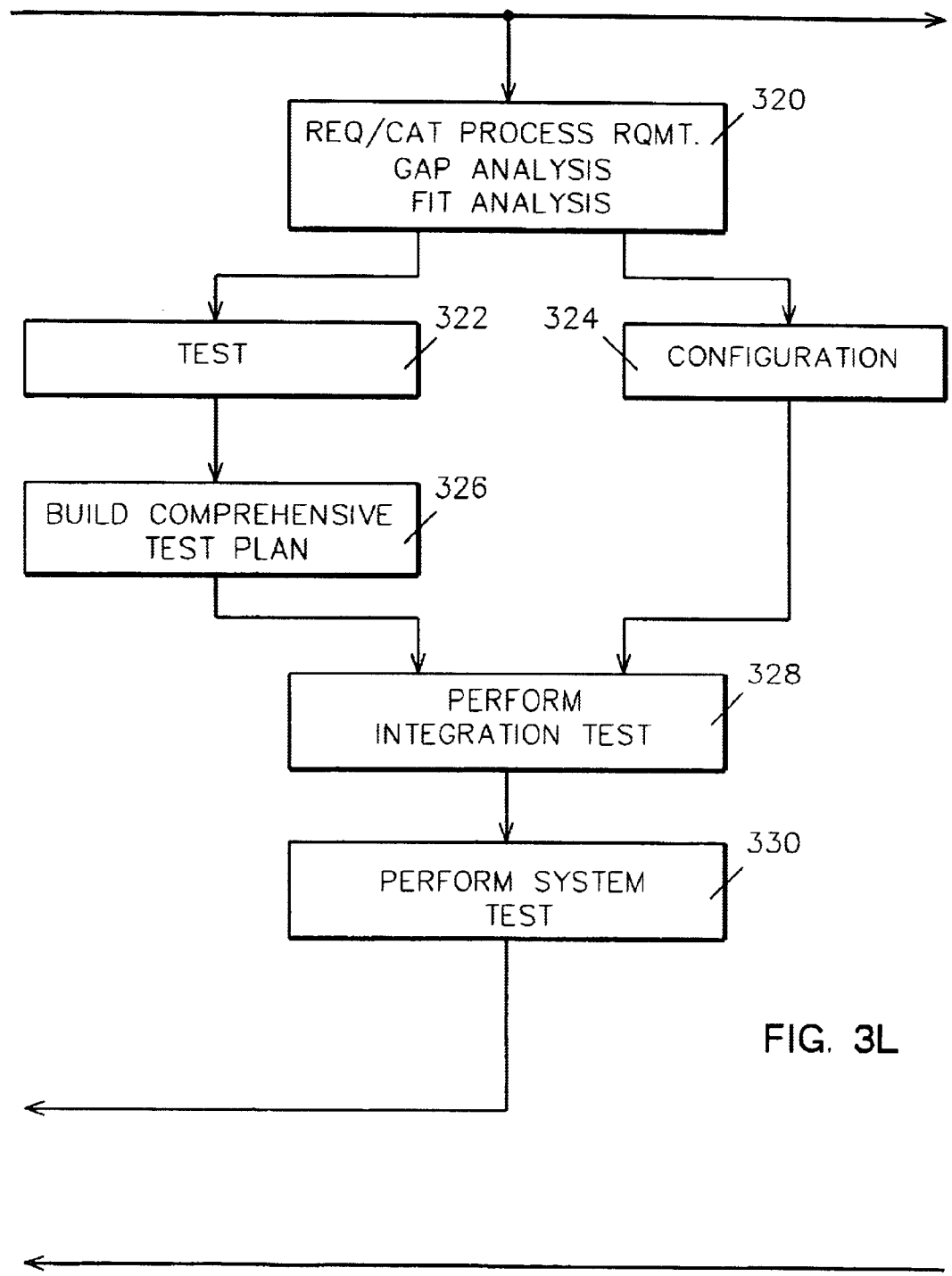
Figure 3M:
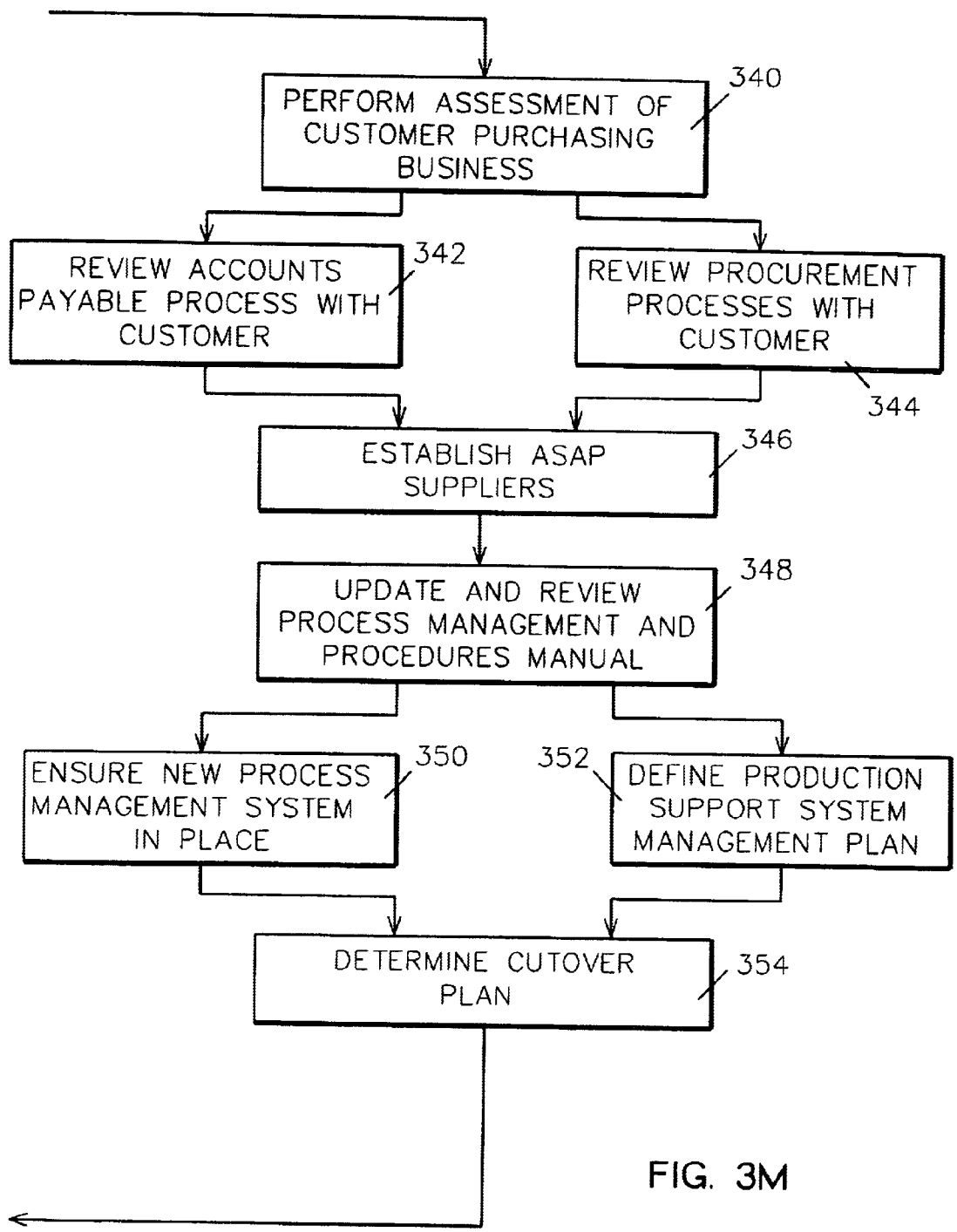

In step 270, shown in FIG. 3G as part of stage 103, but which may as well be included in stage 102, the architecture team 122 accesses detail task template P651 in the course of developing and managing a bridge architecture implementation work plan. Template P651, Table 17, provides, either directly or by way of links to other documents, instructions, flow charts, sample questionnaires, report models and checklists for guiding, coordinating and documenting the work of the architecture team through the steps of this task.

TABLE 17

DETAIL TASK: DEVELOP AND MANAGE BRIDGE ARCHITECTURE IMPLEMENTATION WORK PLAN

CREATION STATUS

| | |
|---|---|
| Category: | I/T |
| Team: | Architecture |
| Offering type: | Req/Cat, SAP, Req/Cat&SAP |
| Stage: | 2. Project Preparation |

IMPORTANCE BUTTONS

| | |
|---|---|
| Education: | Yes |
| Certification: | Yes |
| Auditable: | Yes |
| Critical path: | Yes |

IMPLEMENTATION

| | |
|---|---|
| Executed by: | Service Provider |
| Performed by: | Architect |
| Priority: | High |
| Work effort: | 5 days |
| Sequence: | 4 months prior |

DETAIL TASK DETAILS

Description:

In previous tasks, the architecture team has worked with the customer to gather information relating to the Bridge Architecture Infrastructure. This information has been compiled and documented into the suggested format and represents a full set of requirements to implement the selected service offering.
This task requires the implementation team to document all gaps identified by comparing the standard bridge architecture to the requirements, develop an Architecture Implementation work plan, complete the requirements specifications and obtain agreement from customer on those specifications.
Prerequisites:

All bridge architecture requirements documentation must be complete
Task steps:

1. Define Architecture Implementation Work Plans . . .
2. Submit Change Requests . . .
3. Develop Interlock Planning Summary Spreadsheet . . .
4. Update Project Status Forms with Architecture Implementation . . .
5. Schedule & Conduct Plan Interlock Meetings . . .
6. Validate Requirements Specification within CR Form . . .
7. Obtain Sign Off of Requirements Specification . . .
Deliverables:

Submitted CR forms
Planning Summary Spreadsheet
Implementation Team AD Work Plan
Customer AD Work Plan
Updated Lotus Notes Project Status Form (check with Phil regarding databases to be used with Playbook)
Plan Interlock Schedule
Sign Off on Requirements Specifications
Methodology attachments:

Refer to the Define Bridge Architecture Project Objectives Document detail task for the following attachments =>
I/T POD attachment
Refer to the Perform Bridge Architecture Integration Point Interfaces Work Session detail task for the following attachments =>

TABLE 17-continued

DETAIL TASK: DEVELOP AND MANAGE BRIDGE
ARCHITECTURE IMPLEMENTATION WORK PLAN

Planning Summary Spreadsheet
The following document link contains all additional attachments
needed to complete this task =>
Lotus Notes Project Status Form
Sample Plan Interlock Schedule
Requirements Specification Document In step 272, the architecture team accesses detail task template P6B1 in the course of developing a detail architecture requirements definition. In this task all process flows and architecture diagrams for all new bridges and application extensions and the control point matrix are completed. A detail architecture package is compiled, validated and handed off to the appropriate teams to enable development of changes and extensions and configuration actions required for the selected service offering. Template P6B1 provides, either directly or by way of links to other documents, instructions, flow charts, sample questionnaires, report models and checklists for guiding, coordinating and documenting the work of the architecture team through the steps of this task. Links are provided to the following documents required to perform this task:

Perform Bridge Architecture Integration Point Interfaces Work Session detail task Define Bridge Architecture Project Objectives Document detail task Develop & Manage Bridge Architecture Implementation Work Plan detail task Schedule and Conduct Weekly Interlock Meeting detail task In step 274, the service delivery team accesses summary task template P6C in the course of validating system infrastructure requirements. This task also may pertain to stage 2, and is thus indicated in Table 18. Template P6C provides, either directly or by way of links to other documents, instructions, flow charts, sample questionnaires, report models and checklists for guiding, coordinating and documenting the work of the service delivery team through the steps of this task, as set forth in Table 18.

TABLE 18

SUMMARY TASK: VALIDATE SYSTEM INFRASTRUCTURE
REQUIREMENTS

CREATION STATUS

| | |
|---|---|
| Category: | I/T |
| Team: | Service Delivery |
| Offering type: | Req/Cat Implementation Only, SAP Implementation Only, Req/Cat & SAP Implementation |
| Stage: | 2. Project Preparation |

SUMMARY TASK DETAILS

Description:

In this section of the playbook, the Network/Computing implementation team is conducting review sessions with the customer to analyze the current system infrastructure and framework. All initial data is gathered by the respective team members and compiled into a manageable format. The implementation team members compare the gathered/compiled information to pre existing requirements for the selected service offering. The differences are documented as high level TABLE 18-continued

SUMMARY TASK: VALIDATE SYSTEM INFRASTRUCTURE
REQUIREMENTS gaps on the change request form as well as possible solutions for these gaps. All information is then reviewed with the customer and the implementation team members for agreement. By completing this section of the playbook, the system infrastructure requirements and documents are being created.
This summary task incorporates all detail tasks required to complete the following:
Define and document current customer system infrastructure
Obtain and document requirements to support the infrastructure of the selected service offering
Organize the current information into a format useful for assessing infrastructure requirements and infrastructure design
Ensure this information is complete and well understood
Assess infrastructure requirements
Understand the expected changes required to the current infrastructure
Develop requirements
Document gaps
Most of the infrastructure will be dictated by the service offering package selected by the client. Also by using the tools within the detail tasks of this section, capacity requirements of the system hardware, and software required to support the desired level of business activity can be estimated.
Deliverables:

Network/Computing Infrastructure Requirements Specification:
Gathers all the relevant requirements that influence the infrastructure design, as input to the subsequent design tasks.
Business Network/Computing Environment . . .

In step 276, the SAP and Req/Cat teams access detail task template P341 in the course of application development. The purpose of this task is to develop Custom Programs (interfaces, conversion programs, and additional custom functionality) required to produce a fully configured, operational system, meeting all the Client's Business Requirements. Template P341 provides, either directly or by way of links to other documents, instructions, flow charts, sample questionnaires, report models and checklists for guiding, coordinating and documenting the work of these teams.

TABLE 19

DETAIL TASK: VALIDATE AND CODE BRIDGE CHANGE
REQUESTS (SAP AND REQ/CAT)

CREATION STATUS

| | |
|---|---|
| Category: | Configuration |
| Team: | Req/Cat |
| Offering type: | Req/Cat, SAP, Req/Cat&SAP |
| Stage: | 3 |

DETAIL TASK DETAILS

Description:

The purpose of this task is to develop Custom Programs (interfaces, conversion programs, and additional custom functionality) required to produce a fully configured, operational system, meeting all the Client's Business Requirements.
This includes activities like:
write programs required to convert data from currently existing systems into Req/Cat format.
write interface programs to and from external systems
construct customized tables, screens, and reports
ensure that custom programs being developed and requiring integration with the system undergo complete integration testing
discuss and resolve integration conflicts

TABLE 19-continued

DETAIL TASK: VALIDATE AND CODE BRIDGE CHANGE REQUESTS (SAP AND REQ/CAT)

test and document all programs
integrate with the customer's current e-mail system
Prerequisites:

Approved Change Request
Custom Programs Specifications
Task steps:

In order to develop and validate unique client specific Custom developed programs, perform the following steps:
1. Review Specifications in Change Request . . .
2. Produce Detailed Design document for Custom Programs Based on the CR Specifications, document the detailed design of the solution for the Custom program . . .
3. Conduct Interlock meetings with SAP, customer, and Architecture teams . . .
4. Code all identified custom developed programs . . .
CODE CUSTOMIZATION PROGRAMS this will produce new tables not supplied by the Golden Configuration that are required to support the Client's specific business needs. Building these programs will be accomplished with the use of Req/Cat supplied development tools.
CODE INTERFACE PROGRAMS this will produce all programs required to pass data from the Req/Cat Offering to external systems and to receive data into the Req/Cat Offering from external systems. These programs will include the selection of the correct data, converting the data, if required, and any other routines for reconciling the data between systems.
CODE CONVERSION PROGRAMS this will produce any programs that are required to convert the data required of the new Req/Cat system from the Client's currently existing data. If extensive clean up of currently existing data is required, then that effort must already have been completed.
5. Conduct "peer" review by the programmers
6. Perform Unit Testing
7. Conduct GWA Standards Review . . . Note: This step must be completed by Enterprise GW people before you can deploy the system.
8. Review developed custom programs with CR Requester and Customer and obtain Sign-off
9. Update documentation
10. Release/Migrate Objects to Target Test Server . . .
11. Change CR status . . .
12. Inform Team About Final developed custom programs . . .
Analysis:

Deliverables:

High quality, error free custom programs
System Application Change Request(s) status set to "Ready to Test".
Methodology attachments:

GWA Standards Database (Enterprise coding standards) —>
Req/Cat Golden Configuration —>
Sample of Req/Cat Web Bridge Documentation —>
Req/Cat Code Review Process —>

In step 280, the network team accesses detail task template P6C1 during stage 102 in one embodiment, and during stage 103 in another, in the course of analyzing current network and computing infrastructures. Template P6C1, Table 20, provides, either directly or by way of links to other documents, instructions, flow charts, sample questionnaires, report models and checklists for guiding, coordinating and documenting the work of the network team through the task.

TABLE 20

DETAIL TASK: ANALYZE CURRENT NETWORK/COMPUTING INFRASTRUCTURE

CREATION STATUS

| | |
|---|---|
| Category: | I/T |
| Team: | Network |
| Offering type: | Req/Cat, SAP, Req/Cat&SAP |
| Stage: | 2. Project Preparation |

IMPORTANCE BUTTONS

| | |
|---|---|
| Education: | Yes |
| Certification: | Yes |
| Auditable: | Yes |
| Critical path: | Yes |

IMPLEMENTATION

| | |
|---|---|
| Executed by: | Service Provider |
| Performed by: | Network specialist |
| Priority: | High |
| Work effort: | 25 days |
| Sequence: | 5 months prior |

DETAIL TASK DETAILS

Description:

The purpose of this detail task is to acquire intelligence relating to the network/computing infrastructure required to implement the selected service offering. The objective is to understand the information resources relevant to this project, collect diagrams and text that describe the client's current network/computing environment, compile the information and compare to pre defined HW/SW and communication requirements for the chosen service offering. From this information the high level gaps will be realized and preliminary resolutions can be determined and documented.
Much information is available from many sources. Some clients may have developed a network/computing infrastructure containing installation standards for systems and application designs. Therefore, organize this information into a format useful for the system design, and ensure it is complete and well understood. Use this documentation to ensure that a common understanding of the requirements exists among the designer, the client, and other parties.
Understand the background of the requirements
Extract business numbers for input to performance and sizing activities
Document availability requirements
Document security requirements
Document system management requirements
Document requirements not covered specifically by the above
Identify how the system will be evaluated by the client
Identify key dates and skills for implementation
Assess possible cost constraints and benefits
Path Specific Description
Gather an initial assessment of the requirements for the network/ computing environment required to support the selected service offering by reviewing the Network Assumptions draft document developed in the Perform Bridge Architecture Integration Point Interfaces Work Session detail task =>. Detailed requirements and specifications will rely on a more definite knowledge of the selected service offering implementation strategy, hierarchy, and the results of the prototyping activity.
Network/Computing Infrastructure refers to the Hardware/ Software environment that will support the architecture infrastructure below the application layer for the intended business functionality for the selected service offering. The network/computing infrastructure should provide a stable, adaptable environment to support future growth and change.
Network/Computing Infrastructure requirements may provide a business advantage from new or currently unused technology.
Review the information about the customers current environment, and the high-level planned network/computing environment produced from the assessment stage as well as the POD created by the architecture team in the Define Bridge Architecture Project Objectives Document detail task =>. Using this data, define the high-level network/computing infrastructure requirements.

TABLE 20-continued

DETAIL TASK: ANALYZE CURRENT NETWORK/COMPUTING INFRASTRUCTURE

Prerequisites:

Meet Minimum Requirements: Customers current Network/
Computing Infrastructure must meet minimum requirement as
defined in the Assessment Stage
Task steps:

1. Collect information — Schedule an interview with the
customer I/T SME's to complete the Network Questionnaire and
the Infrastructure Requirements Specification Document: . . .
2. Develop Capacity Requirements . . .
3. Complete Network Study (If required/requested by
customer)
4. Compile information — Information collected in the
previous steps must be compiled and placed in a manageable
format to define gaps in the customer network/computing
infrastructure and develop detailed requirements necessary
to resolve those gaps and implement a stable, changeable
environment that will support the selected service offering . . .
5. Compare information — By comparing the compiled I/T
information to the service offering requirements, the high level
gaps can be identified and preliminary resolutions can be
discussed . . .
6. Document Gaps — This is a high level gap document — first
pass only, this document will be used later in the Design &
Develop Stage as a basis for gathering detailed requirements,
fit gap analysis and gap resolution . . .
7. Update Project Plan — The network/computing
infrastructure project plan should be updated accordingly.
8. Set up Requirements Review — Interlock and review the
requirements documentation with the IGS SDC team
Deliverables:

Network/Computing Infrastructure Requirements Specification . . .
Network/Computing Infrastructure Overview — A reconciled view
of the Future Logical Data and Future Logical Process Models
representing the total set of applications, information systems,
manual systems, management systems, procedures, organizational
structures, objectives, and goals that will make up the business
system in the future. It represents the scope of the project
effort and, in general, it consists of an integrated process and
entity model.
The business model is used to describe the future task flow for
the new business system as defined in the business model to
determine the effectiveness of the business solution or business
system. The business model is also used to capture and document
the design decisions made as a result of reviewing the scope of
the new business system, business needs and trends, and the
objectives and constraints.
Completed Change Request Document — This document will be
completed with all gaps identified from completing this task as
well as the preliminary resolution.
Updated Project Plan — The Network/Computing Environment
project plan should be updated based on changes identified in
this task.

In step 282, the network team accesses detail task template P937 in the course of confirming the network and computing strategy. This detail task is necessary to share the recommended implementation strategy with the customer for the Network/Computing Infrastructure for the selected service offering. The Network/Computing team will discuss the strategy, ensure the customer understands what is expected of them, make any changes to the strategy and obtain customers concurrence. Template P937 provides, either directly or by way of links to other documents, instructions, flow charts, sample questionnaires, report models and checklists for guiding, coordinating and documenting the work of the network team through the steps for doing so, including (1) reviewing and confirming the network/computing strategy with the customer, (2) updating the network/computing strategy, and (3) obtaining the customer approval.

In step 290, the business controls and audit teams accesses detail task template P211 in the course of confirming business controls requirements. Template P211 provides, either directly or by way of links to other documents, instructions, flow charts, sample questionnaires, report models and checklists for guiding, coordinating and documenting the work of the teams through the steps for doing so, including (1) obtaining current control points matrix for the process, (2) obtain current control points matrix for bridges, (3) obtaining or developing requirements documents, (4) building client specific control points documents, (5) reviewing requirements and control points document with process owners, (6) obtaining feedback from the general purchasing/accounts payable team and customer to identify any missing control points, (7) obtaining GP/AP desk procedure name to attach to matrix for review and approval, (8) updating matrices with any changes or new additions agreed upon with the client, (9) submitting via a change request (CR) any control point or business control variances that require system changes, (10) assessing business control risk requirements, (11) obtaining process owner approvals (GP/AP and customer), and (12) interlocking with test team on control points prior to the start of integration test.

In step 292, the business controls and audit teams access detail task template P213 the course of conducting the ASCA self-assessment. Template P213 provides, either directly or by way of links to other documents, instructions, flow charts, sample questionnaires, report models and checklists for guiding, coordinating and documenting the work of the team.

In step 294, the business controls and audit teams accesses detail task template P215 in the course of conducting the ASCA/business controls review. This task is designed to provide the necessary guidelines to prepare for the ASCA review. The Business Controls team will provide dedicated resources throughout the life cycle of the project. The team will also be available for counsel and advice as well as confirming certification readiness through validation of the controls and approaches within the project. Template P215, which is also accessed in step 224 during stage 104, infra, provides, either directly or by way of links to other documents, instructions, flow charts, sample questionnaires, report models and checklists for guiding, coordinating and documenting the work of the team through the task, including the steps set forth in Table 21.

TABLE 21

DETAIL TASK: CONDUCT ASCA/BUSINESS CONTROLS REVIEW

Task Steps:

1. Create and send out overall project plan for ASCA Review
preparation activities.
2. Determine which Enterprise organization will conduct the ASCA/
Business Controls Review.
3. Select review date and contact ASCA Review Organization to
schedule a formal ASCA review. Given there may be some
scheduling problem, this should be done as early as practical to
ensure the review can be conducted within the framework of the
project plan.
4. Close on Review location & reserve conference room (ensure CR
has nearby access to printer, copier, supplies, etc.).
5. Prepare preliminary agenda.
6. Prepare all ASCA Documentation required for the review. This
documentation is described in the ASCA self assessment and in
the ASCA guide provided by Enterprise.
7. Prepare all Sub-process Overviews and descriptions of process
flow.

TABLE 21-continued

DETAIL TASK: CONDUCT ASCA/BUSINESS CONTROLS REVIEW

8. Review agenda content with Business Controls reviewers.
9. Review/firm up content with presenters.
10. Notify required attendees and invite Management.
11. Reserve a projector that connects to lap top for screen viewing of all databases during ASCA Review.
12. Set up Dry Run (w/o reviewers present) for presenters.
13. Ensure the test plan includes those elements of the ASCA checks required to ensure business controls, separation of duties, and authorization matrices, data integrity and security.
14. Create/update/complete all required DOU's & SLA's and have copy for ASCA Review.
15. Review Desk Procedures content for consistency with Control point matrices and package for ASCA Review presentation.
16. Ensure lap top is available the morning of Dry Run and has all appropriate Notes databases replicated (i.e. CRs/PTRs, SAP 3.0 ASCA/Business Controls, SAP 3.0 Documents/UTC Documentation, Test, External Core Documents, etc.).
17. Conduct Dry Run (w/o reviewers) — presenters go through material they will be presenting.
18. Update/finalize agenda and send out.
19. Review/update Application Inventory for accuracy — content must be consistent with other documents.
20. Ensure Separation of Duties Matrix (SOD) is current at time of final review.
21. Create Opening presentations/overview (i.e, Organization, Test, etc).
22. Complete all sections of Bridge templates and package for ASCA Review presentation.
23. Review all Testing and obtain Overall Test signoff.
24. Ensure all approvals have been obtained and signed approval forms available for ASCA Review (Process Ownership, ASCA Requirements, Self Assessment & System Cutover).
25. Have hardcopy of all Risk Acceptances for review.
26. Gather all documentation and ensure it is current, reviewed, and in "presentation" format by morning of reviews (CP matrices, CP Descriptions, Self Assessment, Desk Procedures, Application Inventory, etc).
27. Create a binder of key ASCA/Business Controls documents for each reviewer (Architecture overview, CP matrices, etc).
28. Select someone to act as scribe during the review to document findings, etc. (a 2nd lap top works best).
29. Host/run the ASCA Review.
30. Close out ASCA Review Findings.

In step 300, the transition management team accesses detail task template PD23 in the course of developing and confirming the transition management plan. Template PD23 provides, either directly or by way of links to other documents, instructions, flow charts, sample questionnaires, report models and checklists for guiding, coordinating and documenting the work of the transition management team through the steps for doing so, including the following:
1. Gather all input from previous steps in this project stage.
2. Synthesize the information and prepare all supporting documentation related to previous analysis assessments
3. Complete the development of the transition plan. This step is primarily concerned with completing the steps identified in the sample transition management plan. With the information gathered as part of the workshop, the subject specific assessments, and the general view of the client environment, the TM coordinator will complete the plan and suit it to the client. Those elements that are not applicable to the client should be omitted, deleted from the plan.
4. Review the plan with Enterprise/Service Provider project management
5. Make changes that might result from internal reviews
6. Review plan with Client Management/Client Project Transition Leadership and gain approval In step 302, the transition management team accesses detail task template PD32 in the course of updating, the communications strategy. The objective here is to ensure the sample communications strategy is updated to reflect the specific needs of a client. The strategy will be used to guide communications activities during the course of the project. The specific communication plan will be developed from the strategy. This task is done in cooperation with the Transition Manager, who is responsible for developing and deploying a communication Plan. This task is also designed to keep the 3 parties (Enterprise, Service Provider, Customer) informed of the processes and procedures as the project continues. It is also in keeping with the communications plan to schedule certain reviews with management and process constituents to ensure all questions are being addressed and the implementation is proceeding as planned. Some of these reviews will be a normal part of project management. It is the intent of this section to ensure these reviews are taking place and that communication is continuing to flow from the project to those affected by the changes. A vision statement is prepared to provide a set of guidelines and expectations for the project team at a high level. It is a brief, concise document created by the management team that outlines basic goals and projected outcomes of the project. This statement will be the core of the communication plan and should reflect the culture of the client as much as possible. This vision statement will be used in various communiques during the course of the implementation. Template PD32 provides, either directly or by way of links to other documents, instructions, flow charts, sample questionnaires, report models and checklists for guiding, coordinating and documenting the work of the transition management team through the task.

In step 304, the transition management team accesses detail task template PD31 in the course of building and confirming the campaign plan. The purpose of this task is to develop and gain approval for the detailed communications campaign that will be used in conjunction with the implementation of the new process and system. This is an important step in that it brings together all the communications steps that will be required and outlines the target audiences, content, media, and timing for communications to the affected constituents at the client location. A "Communications Matrix" will be completed that gives all the relevant information on communications to project leadership and acts as a guide for managing communications throughout the project life cycle. Template PD31 provides, either directly or by way of links to other documents, instructions, flow charts, sample questionnaires, report models and checklists for guiding, coordinating and documenting the work of the transition management team through the steps for doing so, including
(1) Acquiring the sample communication plan.
(2) Identifying the various audiences at the client location that will be affected by the coming changes.
(3) Determining how each audience will be affected by the implementation.
(4) Determining what messages (by audience) that need to be developed to ensure a smooth transition
(5) Developing sample messages.
(6) Determining what media will be used for each message.
(7) Determining the timing for each message.
(8) Completing a communications matrix that compiles and displays the information from the previous steps.

In step 306, the transition management team accesses detail task template PD48 in the course of defining a detailed human resources plan. The purpose of this step is to ensure the smooth transition of the process change from an HR perspective. This will focus on the change in job roles and responsibilities by those affected by the new process/system. Template PD48 provides, either directly or by way of links to other documents, instructions, flow charts, sample questionnaires, report models and checklists for guiding, coordinating and documenting the work of the transition management team through the steps for doing so, including (1) determining which jobs will be affected by the implementation of the new process, (2) determining "how" each job will be affected, (3) ensuring a plan is in place to deal with the situation, and (4) determining if other HR considerations may include changes in work location or measurements.

In step 308, the transition management team accesses detail task template PD45 in the course of creating policy changes. The purpose of this step is to provide guidance to the team as they work with the client to institute policy changes that might be introduced as part of the implementation of the new process/system. The objective is to identify those changes necessary and devise a plan to announce/introduce changes in policy. Policy change is defined as those key business rules that are part of the management system for purchasing and procurement. They may be associated with approval levels or procedural changes in the new system. The target is not the day to day operation but management decision and support systems that might be affected. Day to day, operational transition will be managed by the process transition steps. Within this task, the details of the new procedures and policies will be formulated as to how they will be communicated to those affected by the policy change and to the client "public" at large. The announcement must include the procedures necessary for effective communication between the Customer and the Service Provider and Enterprise. Template PD45 provides, either directly or by way of links to other documents, instructions, flow charts, sample questionnaires, report models and checklists for guiding, coordinating and documenting the work of the transition management team through this task.

In step 320, the Req/Cat team accesses summary task template P31 in the course of conducting the Req/Cat functional detailed fit gap analysis. Template P31 provides, either directly or by way of links to other documents, instructions, flow charts, sample questionnaires, report models and checklists for guiding, coordinating and documenting the work of the Req/Cat team through the steps for doing so, including:

(1) Applying the Offering package to the future business model, and identify the level of fit and the level of gap, so that configuration design issues can be resolved. Choose the functionality options from Req/Cat that support the solution.

(2) In preparation for configuration activities, identifying key package data elements (master data) to be loaded into the system and determine the SAP and Req/Cat hierarchy structure to support the customer organization.

(3) Mapping the Offering's Golden package to the client's target business processes at both a functional and data level of detail.

(4) Identifying the table requirements and standard reports from the Golden package that are required to fulfill each functional and sub-functional requirement.

(5) Identifying requirements that the package cannot meet and offer alternate solutions.

(6) Finally, reviewing and updating the project plan.

Knowledge gained regarding project requirements is likely to impact the project scope.

For test step 322, see step 256. This is a unit test of the Req/Cat designs to assure that all of the basic programs work properly.

In step 324, the Req/Cat team accesses summary task template P32 and subsidiary detail tasks in the course of configuring the Req/Cat offering. The purpose of this task is to configure Req/Cat with specific items and information that are definable for each Customer. These include such issues as: Country Languages, Currencies, Units of measures, Calendars, Reporting cycles, End-of-Quarter and End-of-Year processing dates, Organizational Structure, Initial system userid's and profiles. These changes represent the 80% of the Req/Cat Solution which is defined and changed by the Service Provider. Although these are definable by the service provider and do not represent a change to the Golden configuration, they still require a Change Request (CR) to be created in order to document and track the customer configuration. Code changes to the Golden configuration represent the 20% of the Req/Cat Solution and are standard defined. These changes are also referred to as Customization changes, and require a Change Request. Template P32 provides, either directly or by way of links to other documents, instructions, flow charts, sample questionnaires, report models and checklists for guiding, coordinating and documenting the work of the Req/Cat team through the steps of this task. "Ive's Team Studio" is a Lotus Notes code-control tool specifically designed for use with Lotus Notes database development. This tool is used in conjunction with Playbook document databases and attachments that have been created for use during Req/Cat implementations. This task also confirms and validates that Ive's Team Studio is being used to track the customer specific code changes (customization) to the "Golden" code. Ive's Team Studio is used to track all code changes that are made to the Req/Cat Lotus Notes Offering to meet the Customer requirements This tool is used to ease the Customizing process and enable multiple people to be to coding and working on the Notes Design at the same time and ensure standards and formats are still being met.

For step 326, see step 258, supra.

For step 328, see step 264, supra.

For step 330, see step 266, supra.

In step 340, the process (AP/GP/CSC) team accesses detail task template P832 in the course of performing an assessment of the customer purchasing business in order to assess the customer impact on the internal operations of the enterprise. The purpose of this task is to establish impact of the additional purchasing activity on the GP and A/P organization of the enterprise by adding the business of the customer. The impact is estimated based on the customer's past and current purchasing business volume by commodity groups and suppliers. The result is used for estimating requirements for Procurement and Accounts Payable staffing and provides input to T/C regarding anticipated additional transactional traffic. Template P832 provides, either directly or by way of links to other documents, instructions, flow charts, sample questionnaires, report models and checklists for guiding, coordinating and documenting the work of the process team through the steps for doing so, including (1) obtaining transactions or statistics related to current customer purchasing business volume, (2) obtaining a list of current customer suppliers and compare it to the general purchasing suppliers of the enterprise, (3) obtaining historical transactions or statistics on customer purchases sorted by commodity group and supplier, (4) documenting current customer procurement and accounts payable (A/P) process per commodity group, (5) evaluating the additional workload on the enterprise GP and A/P functions by adding the customer purchasing business, and (6) forwarding statistics to appropriate T/C team for evaluating the additional transaction volume.

In step 342, the process team accesses detail task template P822 in the course of reviewing accounts payable processes with the customer. This task leads the process team through the steps of providing the customer A/P team members and managers with detailed walk through and review of the A/P processes in the EPS offering. This is intended to provide the customer team members and process responsible with the necessary insight in the detailed EPS A/P processes to evaluate the impact of applying them to the customer business. It is required for the later assessment of GAP resolutions in customer A/P by applying EPS to the business. The customer team members should be selected so expertise is represented from each of the different processes and commodity groups currently handled by the customer in order to provide a basis for evaluating the EPS offering. Also, in the case of a combination of Req/Cat, SAP and Image, the fact that the purchase order activities of the A/P process will be handled by the enterprise GP group as opposed to the customer needs to be taken into consideration when reviewing the processes. Template P822 provides, either directly or by way of links to other documents, instructions, flow charts, sample questionnaires, report models and checklists for guiding, coordinating and documenting the work of the process team through the steps of this task.

In step 344, the process team accesses detail task template P821 in the course of reviewing the procurement processes with the customer. By this task, customer procurement team members and managers are provided with a detailed walk through and review of the Procurement processes in the EPS offering. This is intended to provide the customer team members and process responsible with the necessary insight in the detailed EPS procurement processes to evaluate the impact of applying them to the customer business. It is required for the later assessment of GAP resolutions in customer procurement by applying EPS to the business. The customer team members should be selected so expertise is represented from each of the different processes and commodity groups currently handled by the customer in order to provide a basis for evaluating the EPS offering. Also, in the case of a combination of Req/Cat, SAP and Image, the fact that the purchase order activities of the procurement process will be handled by enterprise GP as opposed to the customer needs to be taken into consideration when reviewing the processes. Template 344 provides, either directly or by way of links to other documents, instructions, flow charts, sample questionnaires, report models and checklists for guiding, coordinating and documenting the work of the process team through the steps for doing so, including a list of Procurement processes that should be reviewed via the attachment 'Procurement Process Descriptions and flows'.

In step 346, the process team accesses template P863 in the course of establishing ASAP suppliers for the customer. The purpose of ASAP applications is to automate the process of creating purchase orders and outputting those purchase orders to vendors. ASAP applications automatically evaluate purchase requisitions, create purchase orders, and process requester alterations and vendor acknowledgments without buyer intervention. The purpose of this task is to prepare catalog suppliers that will do business via the GP automated ASAP process. The potential ASAP suppliers need to be identified starting with the initial ASAP supplier listing. The addition of the customer needs to be communicated to the ASAP suppliers together with any additional requirements originating from adding the customer. This task requires a comparison between current customer supplier listing and current GP ASAP suppliers to determine which ASAP suppliers will initially apply to the customer. These suppliers will then be contacted and informed of the addition of the customer to the enterprise GP and the impact this may have in terms of customer specific requirements. Template P863 provides, either directly or by way of links to other documents, instructions, flow charts, sample questionnaires, report models and checklists for guiding, coordinating and documenting the work of the process team through the steps for doing so, including (1) determining any requirements that the customer may have that will impact the current ASAP process, (2) reviewing and matching customer supplier listing against existing GP ASAP suppliers, and (3) communicating the addition of the new customer and any additional requirements originating from adding the customer to ASAP suppliers.

In step 348, the process team accesses detail task template P852 in the course of updating and reviewing the process management and procedures manual. The purpose of this task is to determine updates that need to be incorporated in Process Manuals and commodity specific Procedure Manuals for enterprise GP and A/P to accommodate the customers business including validation against enterprise policies. It also includes updates of customer external manuals and review with customer of Customer Manual, Customer Satisfaction Process & Requirements, Application Architecture Flow and Management Proposal Flow. Any changes to the standard EPS processes or applications that are applied based on customer specific requirements will trigger an update of both internal and external processes and procedures. The updates should be based on the GAP resolution documentation generated under process GAP resolution. Template P852 provides, either directly or by way of links to other documents, instructions, flow charts, sample questionnaires, report models and checklists for guiding, coordinating and documenting the work of the process team through the steps for doing so, including (1) determining and applying updates required to enterprise GP and A/P internal process manuals, (2) determining and applying updates required to enterprise GP & A/P internal procedure manuals by commodity, (3) validating updates against enterprise policies, (4) determining and applying updates required to customer external manual, (5) reviewing the customer external manual with the customer, (6) reviewing the application architecture flow with the customer, and (7) reviewing the management proposal flow with the customer.

In step 350, the transition management team accesses detail task template PD51 in the course of ensuring the new process management system is in place. Template PD51 provides, either directly or by way of links to other documents, instructions, flow charts, sample questionnaires, report models and checklists for guiding, coordinating and documenting the work of the transition management team through the task steps for doing so, as illustrated in Table 22.

TABLE 22

DETAIL TASK: ENSURE NEW PROCESS MANAGEMENT SYSTEM IN PLACE

Task Steps:

Organization

Ensure any organizational changes are in place or scheduled for go-live date
Make sure communications plans are updated and plans for announcing any changes in organization TABLE 22-continued

DETAIL TASK: ENSURE NEW PROCESS MANAGEMENT SYSTEM IN PLACE

Provide a feedback mechanism for any person/persons displaced by changes in organization
Ensure new organization are in place
Measurements Review changes in measurement system
Ensure there is a plan in place to cut over to the new measurements
Ensure communications have been developed and delivered to explain the new measurements, including how they are derived, how they are used and their importance to the business.
Management Ensure scheduled changes in management or management responsibilities are on track
Make sure communications have been developed and delivered to explain the changes in the management and why it is important to the clients' organization.
Ensure everyone understands where they fit in the management chain and their path for escalation of issues or getting management direction or decisions on various issues.
Support Ensure the support structure is operational for both user and technical support In step 352, the project office accesses summary task template P95 in the course of defining the production support system management plan. The purpose of this task is to define the extent of support required for ongoing operation after cut-over. This includes both support for the initial configuration including system platforms and networks, the involved business processes and procedures as well as ongoing enhancements aimed at improving the effectiveness and performance of the initial implemented EPS Offering. Depending on the Offering Type and the individual agreement between the involved parties, the supporting entities can be both Customer, Service Provider and enterprise CSC. Template P95 provides, either directly or by way of links to other documents, instructions, flow charts, sample questionnaires, report models and checklists for guiding, coordinating and documenting the work of the project office through the steps for doing so.

In step 354 the cutover plan is determined. The purpose of this step is to complete the detailed transition plan and gain approval for the plan from the client executive and transition management. This is a cross functional plan that requires input from the business process, transition management, project management, and client support teams. Included is an agreement that the plan will be executed at the client site.

Advantages Over the Prior Art

It is an advantage of the invention that there is provided a system and method for evaluating a client's general procurement and accounts payable (GP/AP) system.

It is an advantage of the invention that there is provided an optimized solution for out-sourcing procurement of goods and services.

It is an advantage of the invention that there is provided a system and method for training service providers.

It is an advantage of the invention that there is provided a system and method for managing service providers to assure quality of service.

It is an advantage of the invention that there is provided a system and method for managing a project.

It is an advantage of the invention that there is provided an optimized general procurement and accounts payable system characterized by lower costs, a paperless process, and more comprehensive service with a shorter cycle time.

Alternative Embodiments

It will be appreciated that, although specific embodiments of the invention have been described herein for purposes of illustration, various modifications may be made without departing from the spirit and scope of the invention. In particular, it is within the scope of the invention to provide a computer program product or program element, or a program storage or memory device such as a solid or fluid transmission medium, magnetic or optical wire, tape or disc, or the like, for storing signals readable by a machine, for controlling the operation of a computer according to the method of the invention and/or to structure its components in accordance with the system of the invention.

Further, each step of the method may be executed on any general computer, such as an IBM System 390, AS/400, PC or the like and pursuant to one or more, or a part of one or more, program elements, modules or objects generated from any programming language, such as C++, Java, Pl/1, Fortran or the like. And still further, each said step, or a file or object or the like implementing each said step, may be executed by special purpose hardware or a circuit module designed for that purpose.

Accordingly, the scope of protection of this invention is limited only by the following claims and their equivalents.

We claim:

1. A method for developing from a generic general procurement and accounts payable application a customer specific general procurement and accounts payable application, comprising the steps of:

maintaining a database of templates describing procedures for developing a general procurement and accounts payable system;

serving said templates to development team members including enterprise team members and customer team members;

said development team members operating a plurality of web-enabled user terminals to access via a server said database for coordinating tasks by said service provider and customer team members implementing said procedures;

displaying at at said terminal in a playbook summary view a create a summary task selection button, a create a detailed task button, a folders and views section, a task title display and selection area;

responsive to member selection of said summary tasks selection button presenting in said selection area a listing of deployment stage tasks organized by categories, said categories including requisition and catalog functional detailed fit gap analysis, requisition and catalog offering configuration, electronic data interchange infrastructure design, customer to golden process alignment, requisition and catalog catalog preparation and loading, and accounting driver functional detailed fit gap analysis;

responsive to user selection of said requisition and catalog functional detailed fit gap analysis category, presenting in said selection area a first listing of development stage tasks and responsive to user selection of a development stage task from said first listing presenting to said user a first task template; said user, responsive to said first task template, selectively executing development tasks to confirm requisition and catalog organizational hierarchy, define requisition and catalog functional detailed fit, and resolve functional gaps for requisition and catalog;

responsive to user selection of said requisition and catalog offering configuration category, presenting in said selection area a second listing of development stage tasks and responsive to user selection of a development stage task from said second listing presenting to said user a second task template; said user, responsive to said second task template, selectively executing development tasks to confirm and refine requisition and catalog initial settings and organizational structure, confirm and refine requisition and catalog authorizations, and refine and validate requisition and catalog configuration;

responsive to user selection of said electronic data interchange infrastructure design category, presenting in said selection area a third listing of development stage tasks and responsive to user selection of a development stage task from said third listing presenting to said user a third task template; said user, responsive to said third task template, selectively executing development tasks to establish an electronic data interchange infrastructure, and conduct information technology trading partner testing;

responsive to user selection of said customer to golden process alignment category, presenting in said selection area a fourth listing of development stage tasks and responsive to user selection of a development stage task from said fourth listing presenting to said user a fourth task template; said user, responsive to said fourth task template, selectively executing development tasks to determine gaps between customer and golden processes, and perform process gap resolution;

responsive to user selection of said requisition and catalog catalog data preparation and loading category, presenting in said selection area a fifth listing of development stage tasks and responsive to user selection of a development stare task from said fifth listing presenting to said user a fifth task template; said user, responsive to said fifth task template, selectively executing development tasks to prepare and load a requisition and catalog catalog; and responsive to user selection of said accounting driver functional detailed fit gap analysis category, presenting in said selection area a sixth listing of development stage tasks and responsive to user selection of a development stage task from said sixth listing presenting to said user a sixth task template; said user, responsive to said sixth task template, selectively executing development tasks to confirm accounting driver organizational hierarchy, define accounting driver functional detailed fit, and resolve accounting driver functional gaps.

2. The method of claim 1, each said template storing, either directly or by way of links to other documents, materials for guiding, coordinating and documenting the work of said service provider and customer teams.

3. The method of claim 1, said materials including one or more instructions, flow charts, sample questionnaires, report models and checklists.

4. The method of claim 1, said service provider being one or both of an enterprise or a third party contractor to said enterprise and said customer.

5. The method of claim 1, said templates providing descriptive text for display at said user terminals specifying procedures to be tracked for developing an integrated general procurement and accounts payable system, said procedures including business controls, transformation management, accounting system, and accounting system interface customization procedures.

6. The method of claim 5, said templates specifying the content of electronic documentation for storing and tracking on said server for access from said user terminals, said content including a plurality of items from the set of items including application design documentation, separation of duties documentation, sensitive programs documentation, logical access control documentation, logging documentation, change control for tables documentation, change control for programs documentation, system testing documentation, input controls documentation, processing controls documentation, error handling controls documentation, output controls documentation, balancing and reconciliation documentation, vital records and disaster recovery documentation, records management documentation, reports documentation, local area network documentation, and country specifics documentation.

7. The method of claim 5, said templates specifying the content of electronic documentation for storing and tracking on said server for access from said user terminals for providing an assessment of the quality and completeness of existing program documentation and a determination of the degree to which programs could be efficiently reconstructed if they were destroyed.

8. The method of claim 5, said templates specifying the content of electronic documentation for storing and tracking on said server for access from said user terminals for describing separation of duties of programmer, computer operations, and user groups.

9. The method of claim 5, said templates specifying the content of electronic documentation for storing and tracking on said server for access from said user terminals for describing sensitive programs and controls for preventing unauthorized modification and/or use of said application.

10. The method of claim 5, said templates specifying the content of electronic documentation for storing and tracking on said server for access from said user terminals for describing logical access control.

11. The method of claim 5, said templates specifying the content of electronic documentation for storing and tracking on said server for access from said user terminals for describing a logging mechanism for ensuring a correct audit trail.

12. The method of claim 5, said templates specifying the content of electronic documentation for storing and tracking on said server for access from said user terminals describing a change control system established to evaluate, justify and control changes to tables.

13. The method of claim 5, said templates specifying the content of electronic documentation for storing and tracking on said server for access from said user terminals describing a change control system established to evaluate, justify and control changes to programs.

14. The method of claim 5, said templates specifying the content of electronic documentation for storing and tracking on said server for access from said user terminals describing system testing procedures planned and implemented to ensure that controls are successfully tested and documented.

15. The method of claim 5, said templates specifying the content of electronic documentation for storing and tracking on said server for access from said user terminals describing input controls for insuring accuracy and completeness of information entering said application.

16. The method of claim 5, said templates specifying the content of electronic documentation for storing and tracking on said server for access from said user terminals describing processing controls applied for entry of data to ensure accuracy and completeness of data during computer processing.

17. The method of claim 5, said templates specifying the content of electronic documentation for storing and tracking on said server for access from said user terminals describing error handling controls for error handling and reprocessing of transactions.

18. The method of claim 5, said templates specifying the content of electronic documentation for storing and tracking on said server for access from said user terminals describing output controls for ensuring the integrity of the output data from conclusion of computer processing to delivery to a user.

19. The method of claim 5, said templates specifying the content of electronic documentation for storing and tracking on said server for access from said user terminals describing balancing and reconciliation procedures to reconcile output to input verified as effective.

20. The method of claim 5, said templates specifying the content of electronic documentation for storing and tracking on said server for access from said user terminals describing vital records and disaster recovery procedures for providing continuity or rapid system restoration of a business process immediately following a natural or man-made emergency or disaster.

21. The method of claim 5, said templates specifying the content of electronic documentation for storing and tracking on said server for access from said user terminals describing records management business practices and controls.

22. The method of claim 5, said templates specifying the content of electronic documentation for storing and tracking on said server for access from said user terminals describing reports distribution.

23. The method of claim 5, said templates specifying the content of electronic documentation for storing and tracking on said server for access from said user terminals describing a Local Area Network (LAN) for interconnecting devices implementing said application.

24. The method of claim 5, said templates specifying the content of electronic documentation for storing and tracking on said server for access from said user terminals describing country specific considerations.

25. The method of claim 5, said templates specifying the content of electronic documentation for storing and tracking on said server for access from said user terminals describing transformation management procedures for guiding development team members as they work with said customer to institute policy changes to be made to said customer legacy system as part of said application.

26. The method of claim 25, said templates specifying the content of electronic documentation for storing and tracking on said server for access from said user terminals describing said policy changes including management system approval and change rules for said application.

27. The method of claim 25, said templates specifying the content of electronic documentation for storing and tracking on said server for access from said user terminals describing said policies including measurements, management system, approval levels, supplier contracts and contacts, reward systems, incentive plans, security, and employee and user changes.

28. The method of claim 25, said templates specifying the content of electronic documentation for storing and tracking on said server for access from said user terminals by cross-functional teams for:
    identifying gaps between said legacy application and a new application;
    developing a response to said gaps, including any action required during transition to said new application;
    determining the timing of said response;
    designing a communication plan for communicating said response to affected parties; and
    integrating said response and communication plan into an overall plan for deploying said new application.

29. A method for generation and use of templates for describing deliverables of a general procurement and accounts payable development system, comprising the steps of:
    maintaining a database of generic templates describing the deliverables of tasks for developing a general procurement and accounts payable system;
    serving said templates to development team members including enterprise team members and customer team members;
    said development team members operating a plurality of web-enabled user terminals to access via a server said database for coordinating tasks by said service provider and customer members for configuring said deliverables to specific customer requirements;
    displaying at said terminals in a playbook summary view a create a summary task selection button, a create a detailed task button, a folders and views section, a task title display and selection area;
    responsive to member selection of said summary tasks selection button presenting in said selection area a listing of deployment stage asks organized by categories, said categories including requisition and catalog functional detailed fit cap analysis, requisition and catalog offering configuration, electronic data interchange infrastructure design, customer to golden process alignment, requisition and catalog catalog data preparation and loading, and accounting driver functional detailed fit gap analysis;
    responsive to user selection of said requisition and catalog functional detailed fit gas analysis category, presenting in said selection area a first listing of development stage tasks and responsive to user selection of a development stage task from said first listing presenting to said user a first task template; said user, responsive to said first task template, selectively executing development tasks to confirm requisition and catalog organizational hierarchy, define requisition and catalog functional detailed fit, and resolve functional gaps for requisition and catalog;
    responsive to user selection of said requisition and catalog offering configuration category, presenting in said selection area a second listing of development stage tasks and responsive to user selection of a development stage task from said second listing presenting to said user a second task template; said user, responsive to said second task template, selectively executing development tasks to confirm and refine requisition and catalog initial settings and organizational structure, confirm and refine requisition and catalog authorizations, and refine and validate requisition and catalog configuration;
    responsive to user selection of said electronic data interchange infrastructure design category, presenting in said selection area a third listing of development stage tasks and responsive to user selection of a development stage task from said third listing presenting to said user a third task template; said user, responsive to said third task template, selectively executing development tasks to establish an electronic data interchange infrastructure, and conduct information technology trading partner testing;

responsive to user selection of said customer to golden process alignment category, presenting in said selection area a fourth listing of development stage tasks and responsive to user selection of a development stage task from said fourth listing presenting to said user a fourth task template; said user, responsive to said fourth task template, selectively executing development tasks to determine gaps between customer and golden processes, and perform process gap resolution;

responsive to user selection of said requisition and catalog catalog data preparation and loading category, presenting in said selection area a fifth listing of development stage tasks and responsive to user selection of a development stage task from said fifth listing presenting to said user a fifth task template; said user, responsive to said fifth task template, selectively executing development tasks to prepare and load a requisition and catalog catalog; and responsive to user selection of said accounting driver functional detailed fit gap analysis category, presenting in said selection area a sixth listing of development stage tasks and responsive to user selection of a development stage task from said sixth listing presenting to said user a sixth task template; said user, responsive to said sixth task template, selectively executing development tasks to confirm accounting driver organizational hierarchy, define accounting driver functional detailed fit, and resolve accounting driver functional gaps.

30. A method for evaluating a potential client system and for adapting a general procurement and accounts payable system to the requirements of each of many potential clients, comprising:

maintaining a database of generic templates describing the deliverables of tasks for developing a general procurement and accounts payable system;

serving said templates to development team members including enterprise team members and customer team members;

said development team members operating a plurality of web-enabled user terminals to access via a server said database for coordinating tasks by said service provider and customer team members for configuring said deliverables to specific customer requirements for a customer specific general procurement and accounts payable systems;

displaying at said terminals in a playbook summary view a create a summary task selection button, a create a detailed task button, a folders and views section, a task title display and selection area;

responsive to member selection of said summary tasks selection button presenting in said selection area a listing of deployment stage tasks organized by categories, said categories including requisition and catalog functional detailed fit gap analysis, requisition and catalog offering configuration, electronic data interchange infrastructure design, customer to golden process alignment, requisition and catalog catalog data preparation and loading, and accounting driver functional detailed fit gap analysis;

responsive to user selection of said requisition and catalog functional detailed fit gap analysis category, presenting in said selection area a first listing of development stage tasks and responsive to user selection of a development stage task from said first listing presenting to said user a first task template; said user, responsive to said first task template, selectively executing development tasks to confirm requisition and catalog organizational hierarchy, define requisition and catalog functional detailed fit, and resolve functional gaps for requisition and catalog;

responsive to user selection of said requisition and catalog offering configuration category, presenting in said selection area a second listing of development stage tasks and responsive to user selection of a development stage task from said second listing presenting to said user a second task template; said user, responsive to said second task template, selectively executing development tasks to confirm and refine requisition and catalog initial settings and organizational structure, confirm and refine requisition and catalog authorizations, and refine and validate requisition and catalog configuration;

responsive to user selection of said electronic data interchange infrastructure design category, presenting in said selection area a third listing of development stage tasks and responsive to user selection of a development stage task from said third listing presenting to said user a third task template; said user, responsive to said third task template, selectively executing development tasks to establish an electronic data interchange infrastructure, and conduct information technology trading partner testing;

responsive to user selection of said customer to golden process alignment category, presenting in said selection area a fourth listing of development stage tasks and responsive to user selection of a development stage task from said fourth listing presenting to said user a fourth task template; said user, responsive to said fourth task template, selectively executing development tasks to determine gaps between customer and golden processes, and perform process gap resolution;

responsive to user selection of said requisition and catalog catalog data preparation and loading category, presenting in said selection area a fifth listing of development stage tasks and responsive to user selection of a development stage task from said fifth listing presenting to said user a fifth task template; said user, responsive to said fifth task template, selectively executing development tasks to prepare and load a requisition and catalog catalog; and responsive to user selection of said accounting driver functional detailed fit gap analysis category, presenting in said selection area a sixth listing of development stage tasks and responsive to user selection of a development stage task from said sixth listing presenting to said user a sixth task template; said user, responsive to said sixth task template, selectively executing development tasks to confirm accounting driver organizational hierarchy, define accounting driver functional detailed fit, and resolve accounting driver functional gaps.

31. A program storage device readable by a machine, tangibly embodying a program of instructions executable by a machine to perform method steps for developing a general procurement and accounts payable application, said method steps comprising:

maintaining a database of templates describing procedures for developing a general procurement and accounts payable system;

serving said templates to development team members including enterprise team members and customer team members;

said enterprise team members and said customer team members operating a plurality of web-enabled user terminals to access via a server said database for coordinating tasks by said service provider and customer team members implementing said procedures; each said template storing, either directly or by way of links to other documents, materials for guiding, coordinating and documenting the work of said service provider and customer team members;

displaying at said terminals in a playbook summary view a create a summary task selection button, a create a detailed task button, a folders and views section, a task title display and selection area;

responsive to member selection of said summary tasks selection button presenting in said selection area a listing of deployment stage tasks organized by categories, said categories including requisition and catalog functional detailed fit gap analysis, requisition and catalog offering configuration, electronic data interchange infrastructure design, customer to golden process alignment, requisition and catalog catalog data preparation and loading, and accounting driver functional detailed fit gap analysis;

responsive to user selection of said requisition and catalog functional detailed fit gap analysis category, presenting in said selection area a first listing of development stage tasks and responsive to user selection of a development stage task from said first listing presenting to said user a first task template; said user, responsive to said first task template, selectively executing development tasks to confirm requisition and catalog organizational hierarchy, define requisition and catalog functional detailed fit, and resolve functional gaps for requisition and catalog;

responsive to user selection of said requisition and catalog offering configuration category, presenting in said selection area a second listing of development stare tasks and responsive to user selection of a development stage task from said second listing presenting to said user a second task template; said user, responsive to said second task template, selectively executing development tasks to confirm and refine requisition and catalog initial settings and organizational structure, confirm and refine requisition and catalog authorizations, and refine and validate requisition and catalog configuration;

responsive to user selection of said electronic data interchange infrastructure design category, presenting in said selection area a third listing of development stage tasks and responsive to user selection of a development stage task from said third listing presenting to said user a third task template; said user, responsive to said third task template, selectively executing development tasks to establish an electronic data interchange infrastructure, and conduct information technology trading partner testing;

responsive to user selection of said customer to golden process alignment category, presenting in said selection area a fourth listing of development stage tasks and responsive to user selection of a development stage task from said fourth listing presenting to said user a fourth task template; said user, responsive to said fourth task template, selectively executing development tasks to determine gap a between customer and golden processes, and perform process gap resolution;

responsive to user selection of said requisition and catalog catalog data preparation and loading category, presenting in said selection area a fifth listing of development stage tasks and responsive to user selection of a development staged task from said fifth listing presenting to said user a fifth task template; said user, responsive to said fifth task template, selectively executing development tasks to prepare and load a requisition and catalog catalog; and responsive to user selection of said accounting driver functional detailed fit gap analysis category, presenting in said selection area a sixth listing of development stare tasks and responsive to user selection of a development stage task from said sixth listing presenting to said user a sixth task template; said user, responsive to said sixth task template, selectively executing development tasks to confirm accounting driver organizational hierarchy, define accounting driver functional detailed fit, and resolve accounting driver functional gaps.

32. An article of manufacture comprising:

a computer useable medium having computer readable program code means embodied therein for developing a general procurement and accounts payable application, the computer readable program means in said article of manufacture comprising:

computer readable program code means for causing a computer to effect maintaining a database of templates describing procedures for developing a general procurement and accounts payable system;

computer readable program code means for causing a computer to effect operating a plurality of web-enabled user terminals to access via a server said database for coordinating tasks by a plurality of service provider and customer teams implementing said procedures; each said template storing, either directly or by way of links to other documents, materials for coordinating and documenting the work of said service provider and customer teams;

computer readable program code means for causing a computer to effect displaying at said terminals in a playbook summary view a create a summary task selection button, a create a detailed task button, a folders and views section, a task title display and selection area;

computer readable program code means for causing a computer to effect responsive to member selection of said summary tasks selection button presenting in said selection area a listing of deployment stage tasks organized by categories, said categories including requisition and catalog functional detailed fit gap analysis, requisition and catalog offering configuration, electronic data interchange infrastructure design, customer to golden process alignment, requisition and catalog catalog data reparation and loading, and accounting driver functional detailed fit gap analysis;

computer readable program code means for causing a computer to effect responsive to user selection of said requisition and catalog functional detailed fit gap analysis category, presenting in said selection area a first listing of development stage tasks and responsive to user selection of a development stage task from said first listing presenting to said user a first task template; said user, responsive to said first task template, selectively executing development tasks to confirm requisition and catalog organizational hierarchy, define requisition and catalog functional detailed fit, and resolve functional gaps for requisition and catalog;

computer readable program code means for causing a computer to effect responsive to user selection of said requisition and catalog offering configuration category, presenting in said selection area a second listing of development stage tasks and responsive to user selection of a development stage task from said second listing presenting to said user a second task template; said user, responsive to said second task template, selectively executing development tasks to confirm and refine requisition and catalog initial settings and organizational structure, confirm and refine requisition and catalog authorizations, and refine and validate requisition and catalog configuration;

computer readable program code means for causing a computer to effect responsive to user selection of said electronic data interchange infrastructure design category, presenting in said selection area a third listing of development stage tasks and responsive to user selection of a development stare task from said third listing presenting to said user a third task template; said user, responsive to said third task template, selectively executing development tasks to establish an electronic data interchange infrastructure, and conduct information technology trading partner testing;

computer readable program code means for causing a computer to effect responsive to user selection of said customer to golden process alignment category, presenting in said selection area a fourth listing of development stage tasks and responsive to user selection of a development stage task from said fourth listing presenting to said user a fourth task template; said user, responsive to said fourth task template, selectively executing development tasks to determine gaps between customer and golden processes, and perform process gap resolution;

computer readable program code means for causing a computer to effect responsive to user selection of said requisition and catalog catalog data preparation and loading category, presenting in said selection area a fifth listing of development stage tasks and responsive to user selection of a development stage task from said fifth listing presenting to said user a fifth task template; said user, responsive to said fifth task template, selectively executing development tasks to prepare and load a requisition and catalog catalog; and computer readable program code means for causing a computer to effect responsive to user selection of said accounting driver functional detailed fit gap analysis category, presenting in said selection area a sixth listing of development stage tasks and responsive to user selection of a development stage task from said sixth listing presenting to said user a sixth task template; said user, responsive to said sixth task template, selectively executing development tasks to confirm accounting driver organizational hierarchy, define accounting driver functional detailed fit, and resolve accounting driver functional gaps.

\* \* \* \* \*